US012603847B2

(12) United States Patent
Dou et al.

(10) Patent No.: US 12,603,847 B2
(45) Date of Patent: Apr. 14, 2026

(54) QUALITY OF SERVICE QoS MANAGEMENT METHOD AND APPARATUS

(71) Applicant: Huawei Technologies Co., Ltd., Shenzhen (CN)

(72) Inventors: Fenghui Dou, Beijing (CN); Hui Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/667,627

(22) Filed: May 17, 2024

(65) Prior Publication Data

US 2024/0305574 A1 Sep. 12, 2024

Related U.S. Application Data

(63) Continuation of application No. PCT/CN2022/130993, filed on Nov. 10, 2022.

(30) Foreign Application Priority Data

Nov. 19, 2021 (CN) .......................... 202111373321.2
Jan. 29, 2022 (CN) .......................... 202210112669.4

(51) Int. Cl.
*G06F 15/173* (2006.01)
*H04L 1/20* (2006.01)
(Continued)

(52) U.S. Cl.
CPC .......... *H04L 47/2483* (2013.01); *H04L 1/203* (2013.01); *H04L 47/2433* (2013.01)

(58) Field of Classification Search
CPC ........... H04L 47/2433; H04L 47/2483; H04W 28/24; H04W 28/0268
See application file for complete search history.

(56) References Cited

U.S. PATENT DOCUMENTS

2022/0053381 A1* 2/2022 Xiong ............... H04W 28/0236
2024/0306031 A1 9/2024 Li et al.

FOREIGN PATENT DOCUMENTS

CN 109600664 A 4/2019
EP 4381785 A1 6/2024
(Continued)

OTHER PUBLICATIONS

Yanhua Li et al: "Discussion on Qossupport with PDU Set granularity", 3GPP Draft; R2-2211584; Type Discussion, 3RDGENETON Partnership Project (3GPP), Mobile Competence Centre ; 650, Route Deslucioles; F-06921 Sophia-Antipolis Cedex; Francevol. RAN WG2, No. Toulouse, FR; 20221114-202211184 Nov. 2022 (Nov. 4, 2022), XP052215689, total 6 pages.
(Continued)

*Primary Examiner* — Yves Dalencourt
(74) *Attorney, Agent, or Firm* — Slater Matsil, LLP

(57) ABSTRACT

A quality of service QoS management method includes: a first device sends first information, where the first information is for requesting QoS for a first service; the first device receives second information, where the second information indicates a QoS control manner and a QoS parameter of a first QoS flow, the first QoS flow is for transmitting a data flow of the first service, and the QoS control manner includes a first control manner for controlling based on a data packet group; and the first device performs QoS control on the data flow of the first service based on the second information.

17 Claims, 8 Drawing Sheets

(51) Int. Cl.
H04L 47/2425 (2022.01)
H04L 47/2483 (2022.01)

(56) References Cited

FOREIGN PATENT DOCUMENTS

| | | | |
|---|---|---|---|
| WO | 2018201822 | A1 | 11/2018 |
| WO | 2019158219 | A1 | 8/2019 |
| WO | 2021136636 | A1 | 7/2021 |

OTHER PUBLICATIONS

3rd Generation Partnership Project; Technical Specification Group Services and System Aspects; System architecture for the 5G System (5GS); Stage 2 (Release 16), 3GPP TS 23.501 V16.10.0 (Sep. 2021), total 449 pages.

3rd Generation Partnership Project; Technical Specification Group Services and System Aspects; Procedures for the 5G System (5GS); Stage 2 (Release 15), 3GPP TS 23.502 V15.15.0 (Sep. 2021), total 357 pages.

China Mobile, Huawei, Hisilicon, Tencent, Xiaomi, "New SID on Study on architecture enhancement for XR and media services," SA WG2 Meeting #S2-147E, Oct. 18-22, 2021, Electronic meeting. S2-2108156, total 7 pages.

* cited by examiner

QUALITY OF SERVICE QoS MANAGEMENT METHOD AND APPARATUS

CROSS-REFERENCE TO RELATED APPLICATIONS

This is a continuation of International Patent Application No. PCT/CN2022/130993, filed on Nov. 10, 2022, which claims priority to Chinese Patent Application No. 202210112669.4, filed on Jan. 29, 2022 and Chinese Patent Application No. 202111373321.2, filed on Nov. 19, 2021. All of the aforementioned applications are hereby incorporated by reference in their entireties.

TECHNICAL FIELD

This disclosure relates to the communication field, and more specifically, to a quality of service QoS management method and an apparatus.

BACKGROUND

With continuous development of communication technologies, some services with high-rate and low-latency transmission requirements are becoming more popular. For example, development and improvement of extended reality (XR) technologies continue to progress. The XR technologies include virtual reality (VR), augmented reality (AR), and mixed reality (MR). The foregoing service has a requirement for high-rate and low-latency transmission. An existing quality of service QoS mechanism cannot adapt to the requirement of the foregoing service. For example, problems such as frame freezing and erratic display may occur in an XR service.

SUMMARY

This disclosure provides a quality of service QoS management method and an apparatus, to perform QoS control on a data flow of a service at a granularity of a data packet group and perform correlated QoS control on a plurality of QoS flows, thereby improving flexibility of QoS control and better adapting to different services.

According to a first aspect, a QoS management method is provided. The method includes: A first device sends first information, where the first information is used to request QoS for a first service; the first device receives second information, where the second information indicates a QoS control manner and a QoS parameter of a first QoS flow, the first QoS flow is used for transmitting a data flow of the first service, and the QoS control manner includes a first control manner for controlling based on a data packet group; and the first device performs QoS control on the data flow of the first service based on the second information.

According to the QoS management method implemented in this disclosure, the first device may request a QoS control manner for controlling based on a data packet group, thereby enriching flexibility of QoS management, meeting requirements of different services, improving user experience, and reducing a waste of network resources.

With reference to the first aspect, in some implementations of the first aspect, the method further includes: The QoS control manner further includes a second control manner for controlling based on a data packet.

Based on the foregoing technical solution, the first device may request different QoS control manners to adapt to different services.

With reference to the first aspect, in some implementations of the first aspect, the second information includes a first QoS parameter, the first QoS parameter includes N data packet group-based QoS parameters, N≥1, and N is a positive integer.

Based on the foregoing technical solution, a data packet group-based QoS parameter is defined in this embodiment of this disclosure. When receiving the data packet group-based QoS parameter, the first device performs QoS control on the data flow of the first service at a granularity of a data packet group.

With reference to the first aspect, in some implementations of the first aspect, the second information includes first indication information and a second QoS parameter, the first indication information indicates the QoS control manner of the first QoS flow, and the second QoS parameter indicates the QoS parameter of the first QoS flow.

With reference to the first aspect, in some implementations of the first aspect, when the first indication information indicates that the QoS control manner of the first QoS flow is the first control manner, the second QoS parameter includes at least one data packet group-based QoS parameter; or when the second indication information indicates that the QoS control manner of the first QoS flow is the second control manner, the second QoS parameter includes at least one data packet-based QoS parameter.

With reference to the first aspect, in some implementations of the first aspect, the second QoS parameter includes at least one data packet-based QoS parameter.

Based on the foregoing solution, in this embodiment of this disclosure, the data packet-based QoS parameter is reused, and the QoS control manner is indicated by using the indication information. Therefore, the first device determines the QoS control manner based on the indication information, and guarantees a QoS requirement of a QoS flow by using the data packet-based QoS parameter.

With reference to the first aspect, in some implementations of the first aspect, the first indication information specifically indicates a preferred QoS control manner of the first QoS flow.

With reference to the first aspect, in some implementations of the first aspect, the method further includes: The first device receives service information of the first service, where the service information is used for determining the QoS parameter corresponding to the first QoS flow.

With reference to the first aspect, in some implementations of the first aspect, the service information includes a coding parameter of the first service and/or a weight factor of each data packet group of the first service.

With reference to the first aspect, in some implementations of the first aspect, the method further includes: The terminal device determines the QoS parameter of the first QoS flow based on the second information and the service information.

With reference to the first aspect, in some implementations of the first aspect, the second information includes second indication information, a third QoS parameter, and a fourth QoS parameter, the second indication information indicates a preferred QoS control manner of the first QoS flow, the third QoS parameter includes M data packet group-based QoS parameters, M≥1 and M is a positive integer, the fourth QoS parameter includes L data packet-based QoS parameters, and L≥1 and L is a positive integer.

With reference to the first aspect, in some implementations of the first aspect, the first QoS parameter includes at least one of a group priority level, a group delay budget, a group error rate, an aggregation group error rate, a maximum group loss rate, and a maximum aggregation group loss rate.

With reference to the first aspect, in some implementations of the first aspect, the group priority level indicates priority levels for scheduling different data packet groups on the first QoS flow.

The group delay budget indicates an upper bound for a time that a data packet group on the first QoS flow is delayed between the first device and a second network element, where the second network element is a user plane function UPF network element. The group error rate indicates an upper bound for a rate of data packet groups that are not successfully delivered on the first QoS flow. The aggregation group error rate indicates an upper bound for a rate of weighted data packet groups that are not successfully delivered on the first QoS flow. The maximum group loss rate indicates an upper bound for lost data packet groups on the first QoS flow that can be tolerated. The maximum aggregation group loss rate indicates an upper bound for lost weighted data packet groups on the first QoS flow that can be tolerated.

According to a second aspect, a QoS management method is provided. The method includes: A first network element receives first information sent by a first device, where the first information is used to request QoS for a first service; and the first network element sends second information, where the second information indicates a QoS control manner and a QoS parameter of a first QoS flow, the first QoS flow is used for transmitting a data flow of the first service, and the QoS control manner includes a first control manner for controlling based on a data packet group.

According to the QoS management method implemented in this disclosure, the first network element may indicate, based on a request of the first device, the first device to perform QoS control at a granularity of a data packet group, thereby enriching flexibility of QoS management, meeting requirements of different services, improving user experience, and reducing a waste of network resources.

With reference to the second aspect, in some implementations of the second aspect, the method further includes: The QoS control manner further includes a second control manner for controlling based on a data packet.

Based on the foregoing technical solution, embodiments of this disclosure include a plurality of different QoS control manners, to adapt to different services.

With reference to the second aspect, in some implementations of the second aspect, the second information includes a first QoS parameter, the first QoS parameter includes N data packet group-based QoS parameters, N≥1, and N is a positive integer.

Based on the foregoing technical solution, a data packet group-based QoS parameter is defined in this embodiment of this disclosure. When receiving the data packet group-based QoS parameter, the first device performs QoS control on the data flow of the first service at a granularity of a data packet group.

With reference to the second aspect, in some implementations of the second aspect, the second information includes first indication information and a second QoS parameter, the first indication information indicates the QoS control manner of the first QoS flow, and the second QoS parameter indicates the QoS parameter of the first QoS flow.

With reference to the second aspect, in some implementations of the second aspect, when the first indication information indicates that the QoS control manner of the first QoS flow is the first control manner, the second QoS parameter includes at least one data packet group-based QoS parameter; or when the second indication information indicates that the QoS control manner of the first QoS flow is the second control manner, the second QoS parameter includes at least one data packet-based QoS parameter.

With reference to the second aspect, in some implementations of the second aspect, the second QoS parameter includes at least one data packet-based QoS parameter.

With reference to the second aspect, in some implementations of the second aspect, the first indication information specifically indicates a preferred QoS control manner of the first QoS flow.

With reference to the second aspect, in some implementations of the second aspect, the method further includes: The first network element obtains service information of the first service, where the service information is used for determining the QoS parameter corresponding to the first QoS flow.

With reference to the second aspect, in some implementations of the second aspect, the service information includes a coding parameter of the first service and/or a weight factor of each data packet group of the first service.

With reference to the second aspect, in some implementations of the second aspect, the method further includes: The first network element sends the service information.

With reference to the second aspect, in some implementations of the second aspect, the second information includes second indication information, a third QoS parameter, and a fourth QoS parameter, the second indication information indicates a preferred QoS control manner of the first QoS flow, the third QoS parameter includes M data packet group-based QoS parameters, M≥1 and M is a positive integer, the fourth QoS parameter includes L data packet-based QoS parameters, and L≥1 and L is a positive integer.

With reference to the second aspect, in some implementations of the second aspect, before the first network element sends the second information, the method further includes:

the first network element determines the QoS control manner of the first QoS flow based on the first service.

With reference to the second aspect, in some implementations of the second aspect, before the first network element sends the second information, the method further includes: The first network element determines the QoS control manner of the first QoS flow based on whether the first device supports the first control manner.

With reference to the second aspect, in some implementations of the second aspect, the first QoS parameter includes at least one of a group priority level, a group delay budget, a group error rate, an aggregation group error rate, a maximum group loss rate, and a maximum aggregation group loss rate.

With reference to the second aspect, in some implementations of the second aspect, the group priority level indicates priority levels for scheduling different data packet groups on the first QoS flow.

The group delay budget indicates an upper bound for a time that a data packet group on the first QoS flow is delayed between the first device and a second network element, where the second network element is a user plane function UPF network element. The group error rate indicates an upper bound for a rate of data packet groups that are not successfully delivered on the first QoS flow. The aggregation group error rate indicates an upper bound for a rate of weighted data packet groups that are not successfully delivered on the first QoS flow. The maximum group loss rate indicates an upper bound for lost data packet groups on the first QoS flow that can be tolerated. The maximum aggregation group loss rate indicates an upper bound for lost weighted data packet groups on the first QoS flow that can be tolerated.

According to a third aspect, a QoS management method is provided. The method includes: A first device sends third information, where the third information is used to request QoS for a second service; the first device receives fourth information, where the fourth information includes a QoS parameter used for performing correlated control on a second QoS flow and a third QoS flow, and the second QoS flow and the third QoS flow are used for transmitting a data flow of the second service; and the first device performs correlated QoS control on the data flow of the second service based on the fourth information.

According to the QoS management method implemented in this disclosure, when the data flow of the second service is carried on a plurality of QoS flows, the first device may perform correlated control on the plurality of QoS flows, thereby improving flexibility of QoS management, meeting requirements of different services, and improving user experience.

With reference to the third aspect, in some implementations of the third aspect, the fourth information includes a fifth QoS parameter, and the fifth QoS parameter includes K correlated QoS parameters, where K≥1 and K is a positive integer.

With reference to the third aspect, in some implementations of the third aspect, the fourth information includes third indication information and a sixth QoS parameter, the third indication information indicates to perform correlated control on the second QoS flow and the third QoS flow, the sixth QoS parameter is a parameter used for correlated QoS control, the sixth QoS includes L data packet group-based QoS parameters, L≥1, and L is a positive integer; or the sixth QoS parameter includes J data packet-based QoS parameters, J≥1, and J is a positive integer.

With reference to the third aspect, in some implementations of the third aspect, the fifth QoS parameter includes at least one of a correlated QoS flow error rate, a correlated QoS flow aggregation error rate, a correlated QoS flow maximum loss rate, a correlated QoS flow maximum aggregation loss rate, or a correlated QoS flow maximum bit rate.

With reference to the third aspect, in some implementations of the third aspect, the correlated QoS flow error rate indicates an upper bound for a rate of data packet groups or data packets that are not successfully delivered on the second QoS flow and the third QoS flow.

The correlated QoS flow aggregation error rate indicates an upper bound for a rate of weighted data packet groups or data packets that are not successfully delivered on the second QoS flow and the third QoS flow. The correlated QoS flow maximum loss rate indicates an upper bound for lost data packet groups or data packets on the second QoS flow and the third QoS flow that can be tolerated. The correlated QoS flow maximum aggregation group loss rate indicates an upper bound for lost weighted data packet groups or weighted data packets on the second QoS flow and the third QoS flow that can be tolerated. The correlated QoS flow maximum bit rate indicates an upper bound for a maximum aggregation bit rate of the second QoS flow and the third QoS flow.

According to a fourth aspect, a QoS management method is provided. The method includes: A first network element receives third information sent by a first device, where the third information is used to request QoS for a second service; and the first network element sends fourth information, where the fourth information includes a QoS parameter used for performing correlated control on a second QoS flow and a third QoS flow, and the second QoS flow and the third QoS flow are used for transmitting a data flow of the second service.

According to the QoS management method implemented in this disclosure, when a data flow of a service is carried on a plurality of QoS flows, the first network element may indicate the first device to perform correlated control on the plurality of QoS flows, thereby improving flexibility of QoS management, meeting requirements of different services, and improving user experience.

With reference to the fourth aspect, in some implementations of the fourth aspect, the fourth information includes a fifth QoS parameter, and the fifth QoS parameter includes K correlated QoS parameters, where K≥1 and K is a positive integer.

With reference to the fourth aspect, in some implementations of the fourth aspect, the fourth information includes third indication information and a sixth QoS parameter, the third indication information indicates to perform correlated control on the second QoS flow and the third QoS flow, the sixth QoS parameter is a parameter used for correlated QoS control, the sixth QoS includes L data packet group-based QoS parameters, L≥1, and L is a positive integer; or the sixth QoS parameter includes J data packet-based QoS parameters, J≥1, and J is a positive integer.

With reference to the fourth aspect, in some implementations of the fourth aspect, the fifth QoS parameter includes at least one of a correlated QoS flow error rate, a correlated QoS flow aggregation error rate, a correlated QoS flow maximum loss rate, a correlated QoS flow maximum aggregation loss rate, or a correlated QoS flow maximum bit rate.

With reference to the fourth aspect, in some implementations of the fourth aspect, the correlated QoS flow error rate indicates an upper bound for a rate of data packet groups or data packets that are not successfully delivered on the second QoS flow and the third QoS flow. The correlated QoS flow aggregation error rate indicates an upper bound for a rate of weighted data packet groups or data packets that are not successfully delivered on the second QoS flow and the third QoS flow. The correlated QoS flow maximum loss rate indicates an upper bound for lost data packet groups or data packets on the second QoS flow and the third QoS flow that can be tolerated. The correlated QoS flow maximum aggregation group loss rate indicates an upper bound for lost weighted data packet groups or weighted data packets on the second QoS flow and the third QoS flow that can be tolerated. The correlated QoS flow maximum bit rate indicates an upper bound for a maximum aggregation bit rate of the second QoS flow and the third QoS flow.

According to a fifth aspect, a communication apparatus is provided. The apparatus is configured to perform the method in any one of the possible implementations of the first aspect to the fourth aspect. Specifically, the apparatus may include units and/or modules configured to perform the method in any one of the possible implementations of the first aspect to the fourth aspect, for example, a processing unit and/or a communication unit. In an implementation, the apparatus is a communication device (for example, a terminal device or a network device). When the apparatus is a communication device, the communication unit may be a transceiver or an input/output interface, and the processing unit may be at least one processor. Optionally, the transceiver may be a transceiver circuit. Optionally, the input/output interface may be an input/output circuit. In another implementation, the apparatus is a chip, a chip system, or a circuit used in a communication device (for example, a terminal device or a network device). When the apparatus is a chip, a chip system, or a circuit used in a communication device, the communication unit may be an input/output interface, an interface circuit, an output circuit, an input circuit, a pin, a related circuit, or the like on the chip, the chip system, or the circuit; and the processing unit may be at least one processor, a processing circuit, a logic circuit, or the like.

According to a sixth aspect, a communication apparatus is provided. The apparatus includes at least one processor, configured to execute a computer program or instructions stored in a memory, to perform the method in any one of the possible implementations of the first aspect to the fourth aspect.

Optionally, the apparatus further includes the memory, configured to store the computer program or the instructions. Optionally, the apparatus further includes a communication interface, and the processor reads, through the communication interface, the computer program or the instructions stored in the memory.

In an implementation, the apparatus is a communication device (for example, a terminal device or a network device).

In another implementation, the apparatus is a chip, a chip system, or a circuit used in a communication device (for example, a terminal device or a network device).

According to a seventh aspect, this disclosure provides a processor, configured to perform the methods provided in the first aspect to the fourth aspect. Operations such as sending and obtaining/receiving related to the processor may be understood as operations such as output and receiving or input of the processor, or sending and receiving operations performed by a radio frequency circuit and an antenna, unless otherwise specified, or provided that the operations do not contradict actual functions or internal logic of the operations in related descriptions. This is not limited in this disclosure.

According to an eighth aspect, a computer-readable storage medium is provided. The computer-readable medium stores program code to be executed by a device, and the program code is used to perform the method in any one of the possible implementations of the first aspect to the fourth aspect.

According to a ninth aspect, a computer program product including instructions is provided. When the computer program product runs on a computer, the computer is enabled to perform the method in any one of the possible implementations of the first aspect to the fourth aspect.

According to a tenth aspect, a communication system is provided. The communication system includes the foregoing terminal device and network device.

For beneficial effects of the fifth aspect to the tenth aspect, refer to the beneficial effects of the first aspect to the fourth aspect. Details are not described.

8

Figure 6:
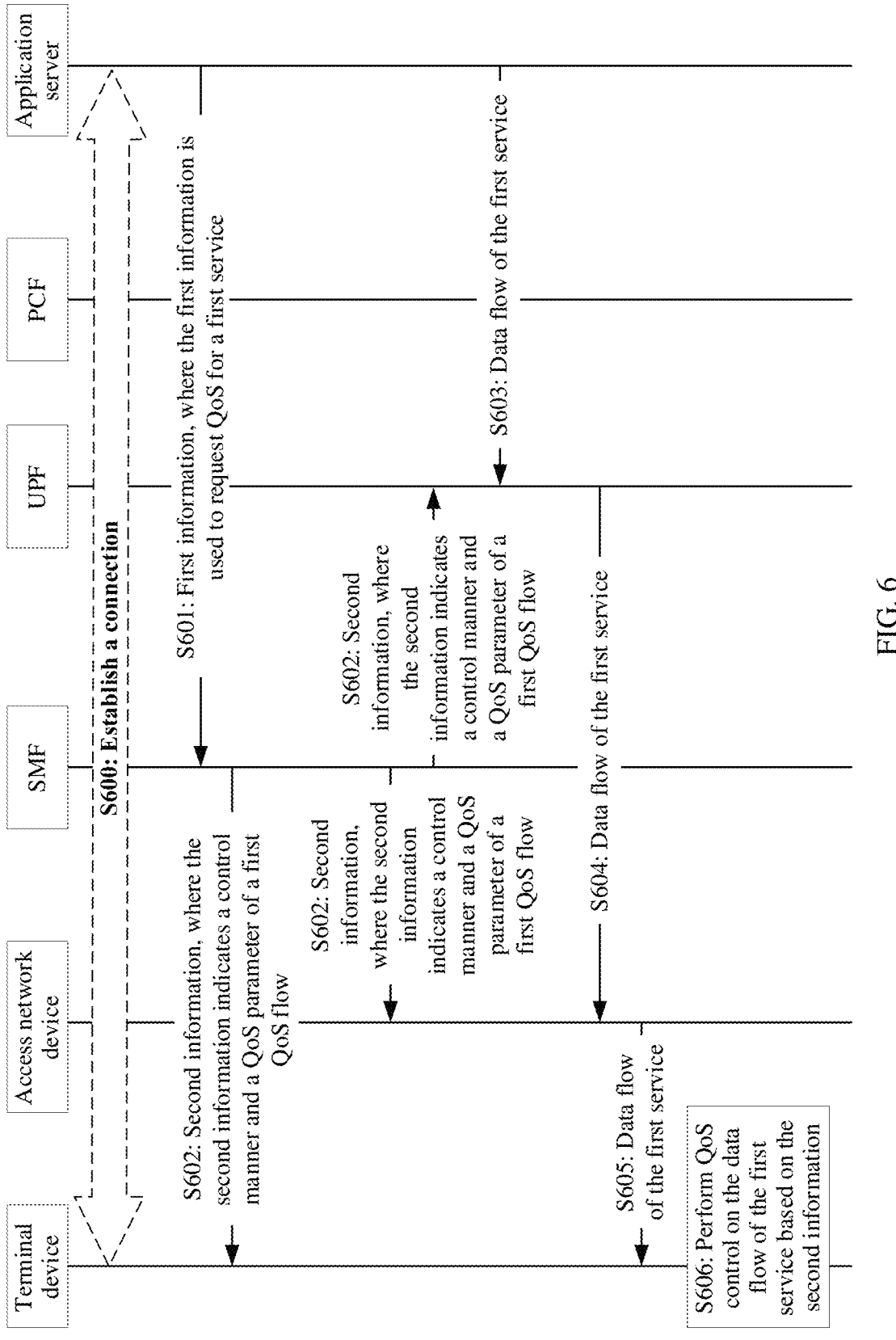
Figure 7:
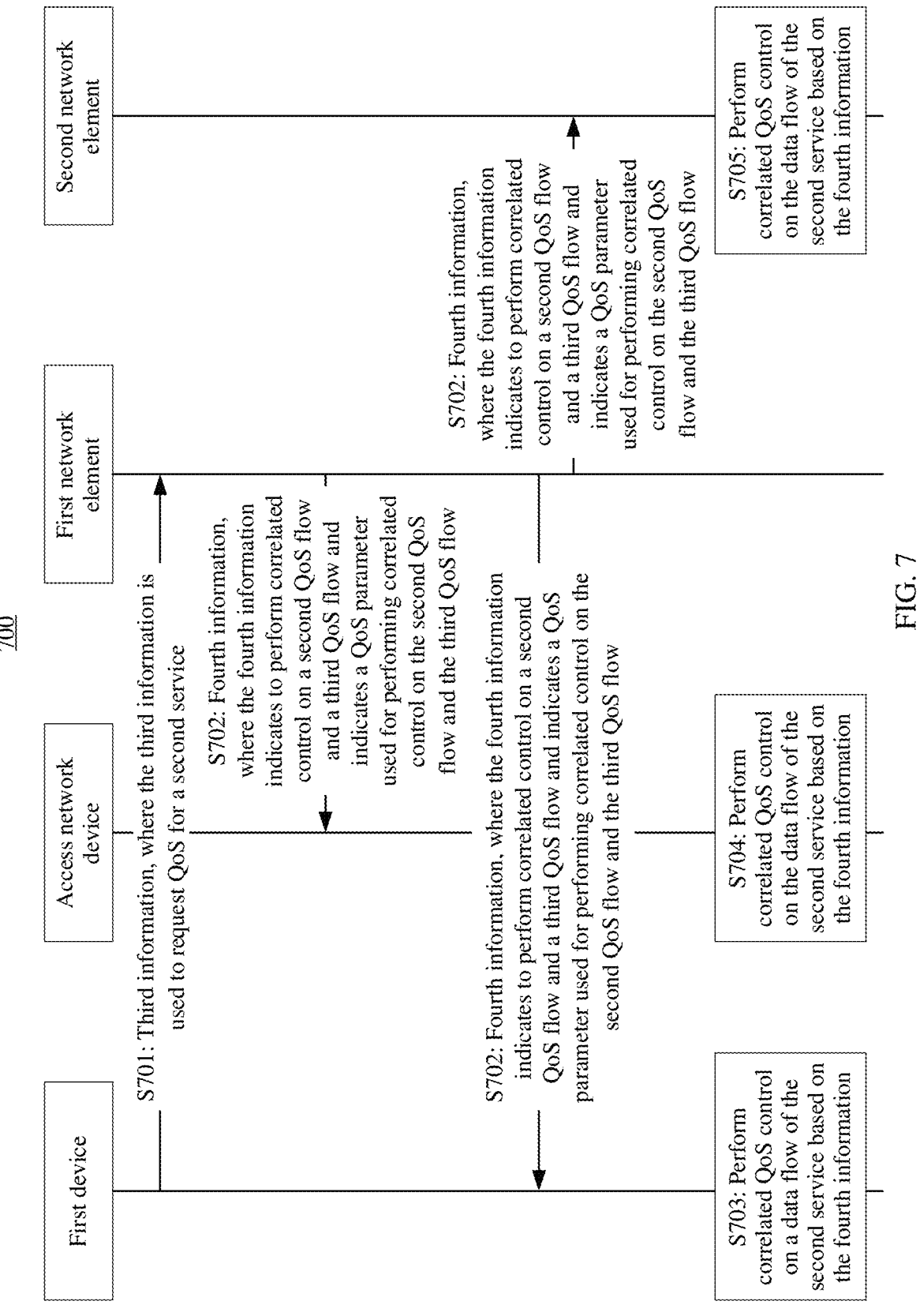
Figure 8:
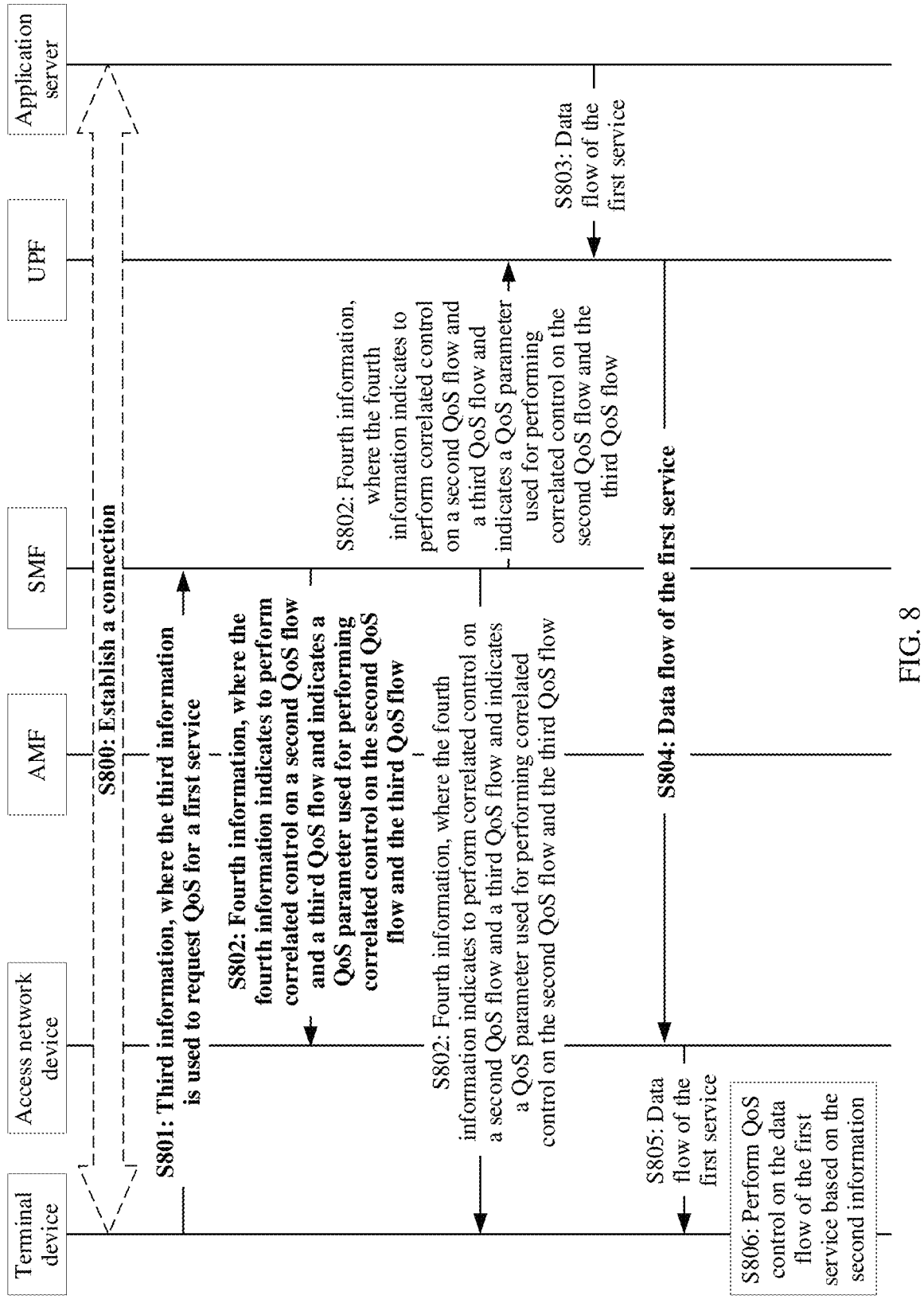
Figure 9:
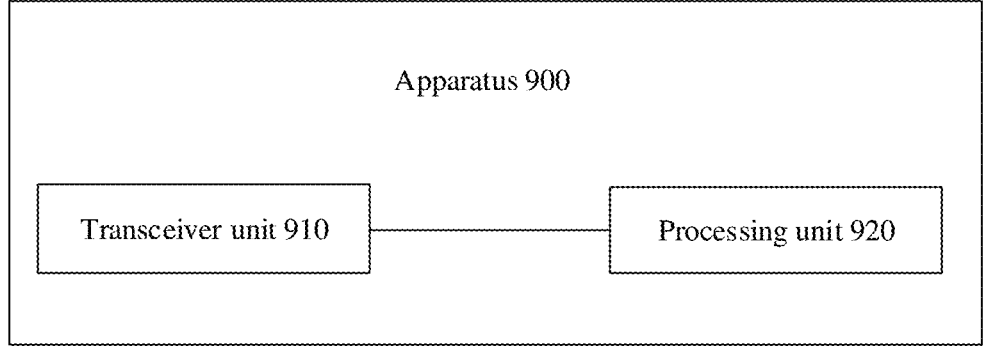
Figure 10:
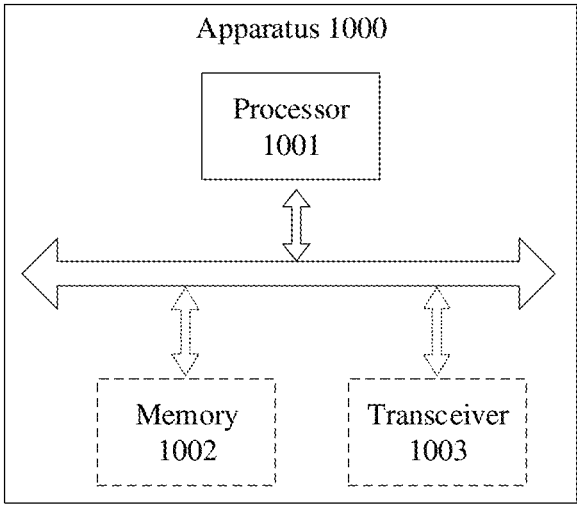

FIG. 6 is a schematic flowchart of a QoS management method according to this disclosure;

FIG. 7 is a schematic flowchart of a QoS management method according to this disclosure;

FIG. 8 is a schematic flowchart of a QoS management method according to this disclosure;

FIG. 9 is a schematic block diagram of an apparatus according to this disclosure; and FIG. 10 is a schematic block diagram of an apparatus according to this disclosure.

DETAILED DESCRIPTION OF ILLUSTRATIVE EMBODIMENTS

The following describes technical solutions of this disclosure with reference to accompanying drawings.

The technical solutions of embodiments of this disclosure may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future evolved communication system.

Figure 1:
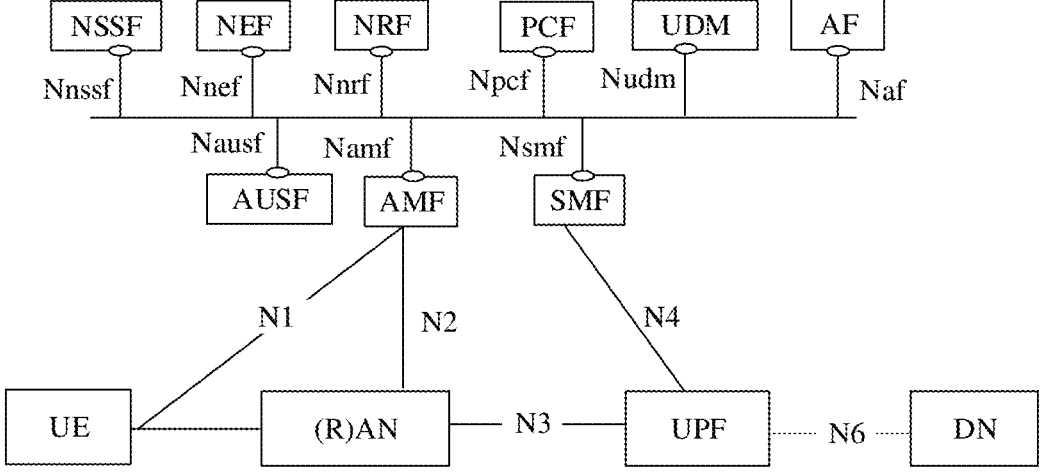
FIG. 1 is a schematic of an architecture of a 5G mobile communication system.

FIG. 1 is a schematic of a network architecture of a communication system to which embodiments of this disclosure are applicable. The network architecture includes a terminal device, an access network device, an access management network element, a session management network element, a user plane network element, a policy control network element, a network slice selection network element, a network repository function network element, a network data analytics network element, a unified data management network element, a unified data repository network element, an authentication service function network element, a network capability exposure network element, an application function network element, and a data network (data network, DN) connected to an operator network. The terminal device may send service data to the data network via the access network device and the user plane network element, and receive service data from the data network.

The terminal device is a device having a wireless transceiver function, and may be deployed on land, including indoor or outdoor, handheld, wearable, or in-vehicle; or may be deployed on a water surface (for example, on a ship); or may be deployed in the air (for example, on an aircraft, a balloon, or a satellite). The terminal device may communicate with a core network through a radio access network (RAN), and exchange a voice and/or data with the RAN. The terminal device may be a mobile phone, a tablet computer (Pad), a computer having a wireless transceiver function, a mobile internet device (MID), a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, an uncrewed aerial vehicle, an uncrewed aerial vehicle controller, or the like. An application scenario is not limited in embodiments of this disclosure. The terminal device may also be referred to as user equipment (UE), a mobile station, a remote station, or the like. A specific technology, a device form, and a name that are used by the terminal device are not limited in embodiments of this disclosure.

The access network device is a device that is in a network and that is used to connect a terminal device to a wireless network. The access network device may be a node in a radio access network. The access network device may also be referred to as a base station or a radio access network (RAN) node (or device). A network device may include an evolved NodeB (NodeB, eNB, or e-NodeB, evolved NodeB) in a long term evolution (LTE) system or an LTE-advanced (LTE-A) system, for example, a conventional macro base station eNB and a micro base station eNB in a heterogeneous network scenario; or may include a next generation NodeB (gNB) in a 5th generation (5G) mobile communication technology new radio (NR) system; or may include a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband pool BBU pool, a Wi-Fi access point (AP), or the like; or may include a centralized unit or central unit (CU) and a distributed unit (DU) in a cloud access network (CloudRAN) system. This is not limited in embodiments of this disclosure. In a split deployment scenario in which the access network device includes the CU and the DU, the CU supports protocols such as radio resource control (RRC), the packet data convergence protocol (PDCP), and the service data adaptation protocol (SDAP), and the DU mainly supports a radio link control (RLC) layer protocol, a media access control (MAC) layer protocol, and a physical layer protocol.

The access management network element is mainly used for attachment, mobility management, and a tracking area update procedure of a terminal in a mobile network. The access management network element terminates a non-access stratum (NAS) message, completes registration management, connection management, reachability management, tracking area list (TA list) allocation, mobility management, and the like, and transparently routes a session management (SM) message to the session management network element. In the 5th generation (5G) communication system, the access management network element may be an access and mobility management function (AMF). In a future communication system (for example, a 6G communication system), a mobility management network element may still be an AMF network element, or may have another name. This is not limited in this disclosure.

The session management network element is mainly used for session management in a mobile network, for example, session establishment, modification, and release. A specific function is, for example, allocating an internet protocol (IP) address to the terminal, or selecting a user plane network element that provides a packet forwarding function. In the 5G communication system, the session management network element may be a session management function (SMF). In the future communication system (for example, the 6G communication system), the session management network element may still be an SMF network element, or may have another name. This is not limited in this disclosure.

The user plane network element is mainly used for processing a user packet, for example, forwarding, charging. The user plane network element may also be referred to as a protocol data unit (PDU) session anchor (PSA). In the 5G communication system, the user plane network element may be a user plane function (UPF). In the future communication system (for example, the 6G communication system), the user plane network element may still be a UPF network element, or may have another name. This is not limited in this disclosure.

The policy control network element includes a user subscription data management function, a policy control function, a charging policy control function, quality of service (QoS) control, and the like. In the 5G communication system, the policy control network element may be a policy control function (PCF). In the future communication system (for example, the 6G communication system), the policy control network element may still be a PCF network element, or may have another name. This is not limited in this disclosure.

The network slice selection network element is mainly used to select a proper network slice for a service of the terminal device. In the 5G communication system, the network slice selection network element may be a network slice selection function (NSSF) network element. In the future communication system (for example, the 6G communication system), the network slice selection network element may still be an NSSF network element, or may have another name. This is not limited in this disclosure.

The network repository function network element is mainly used to provide registration and discovery functions of a network element or a service provided by the network element. In the 5G communication system, the network repository function network element may be a network repository function (network repository function, NRF). In the future communication system (for example, the 6G communication system), the network repository function network element may still be an NRF network element, or may have another name. This is not limited in this disclosure.

The network data analytics network element may collect data from each network function (network function, NF), for example, the policy control network element, the session management network element, the user plane network element, the access management network element, or the application function network element (via the network capability exposure function network element), and perform analysis and prediction. In the 5G communication system, the network data analytics network element may be a network data analytics function (network data analytics function, NWDAF). In the future communication system (for example, the 6G communication system), the network data analytics network element may still be an NWDAF network element, or may have another name. This is not limited in this disclosure.

The unified data management network element is mainly used to manage subscription information of the terminal device. In the 5G communication system, the unified data management network element may be unified data management (unified data management, UDM). In the future communication system (for example, the 6G communication system), the unified data management network element may still be a UDM network element, or may have another name. This is not limited in this disclosure.

The unified data repository network element is mainly used to store structured data information, including subscription information, policy information, and network data or service data defined in a standard format. In the 5G communication system, the unified data repository network element may be a unified data repository (UDR). In the future communication system (for example, the 6G communication system), the unified data repository network element may still be a UDR network element, or may have another name. This is not limited in this disclosure.

The authentication service function network element is mainly used to perform security authentication on the terminal device. In the 5G communication system, the authentication service function network element may be an authentication server function (AUSF). In the future communication system (for example, the 6G communication system), the authentication service function network element may still be an AUSF network element, or may have another name. This is not limited in this disclosure.

The network capability exposure network element may expose some functions of the network to an application in a controlled manner. In the 5G communication system, the network capability exposure network element may be a network exposure function (NEF). In the future communication system (for example, the 6G communication system), the network capability exposure network element may still be an NEF network element, or may have another name. This is not limited in this disclosure.

The application function network element may provide service data of various applications for a control plane network element in a communication network of an operator, or obtain data information and control information of a network from a control plane network element in a communication network. In the 5G communication system, the application function network element may be an application function (AF). In the future communication system (for example, the 6G communication system), the application function network element may still be an AF network element, or may have another name. This is not limited in this application.

The data network is mainly used to provide a data transmission service for the terminal device. The data network may be a private network, for example, a local area network, may be a public data network (PDN), for example, the internet (Internet), or may be a dedicated network jointly deployed by operators, for example, a dedicated network deployed to configure an IP multimedia network subsystem (IMS) service.

It should be understood that the foregoing network elements or the functions may be network elements in a hardware device, software functions running on dedicated hardware, or virtualized functions instantiated on a platform (for example, a cloud platform). Optionally, the foregoing network element or function may be implemented by one device, or may be jointly implemented by a plurality of devices, or may be a function module in one device. This is not specifically limited in embodiments of this disclosure.

To facilitate understanding of the technical solutions provided in this disclosure, the following describes related technical concepts in applications in embodiments of this disclosure.

1. XR technologies refer to generating, through computer technologies and wearable devices, an environment that combines both real and virtual elements and that enables human-computer interaction. The XR technologies have advantages such as multi-view and strong interaction, can provide brand-new visual experience for users, and has great application value and business potential. XR includes technologies such as VR, AR, and MR, and can be widely used in many fields such as entertainment, gaming, medical care, advertising, industry, online education, and engineering. The VR technology is mainly to render visual and audio scenarios to simulate sensory stimulation of vision and audio in the real world to a user as much as possible. The VR technology usually requires the user to wear an XR terminal (for example, a head-mounted device) to simulate vision and/or hearing of the user. The VR technology may further perform action tracking on the user, to update simulated visual and/or auditory content in a timely manner. The AR technology is mainly to provide additional visual and/or auditory information or manually generated content in a real environment perceived by the user. The user may directly (where for example, sensing, processing, and rendering are not performed) or indirectly (where for example, transfer is performed through a sensor or the like) obtain the real environment, and further enhancement processing is performed. The MR technology is to insert some virtual elements into a physical scenario, to provide immersive experience for the user by adding these elements as a part of a real scenario. A network device may process and transmit data (which may be referred to as XR data) generated by an XR service. For example, a network device in a cloud may render and encode (for example, source encode) XR source data, and transmit XR data to an XR terminal via a network device in a core network and/or an access network. The XR terminal provides diversified XR experience (for example, immersive experience, visual experience, interaction experience, or device experience) for the user by processing the XR data. XR experience can be evaluated in a plurality of different dimensions, including, for example, one or more of the following evaluation dimensions: image definition, image smoothness, image distortion, image stereopsis, black border on the image, image smearing, sound quality, sound effect, field of view, frame freezing, artifact, glare, audio and video synchronization, interaction freedom, interaction operation response speed, interaction operation precision, interaction content loading speed, and the like.

Figure 2:
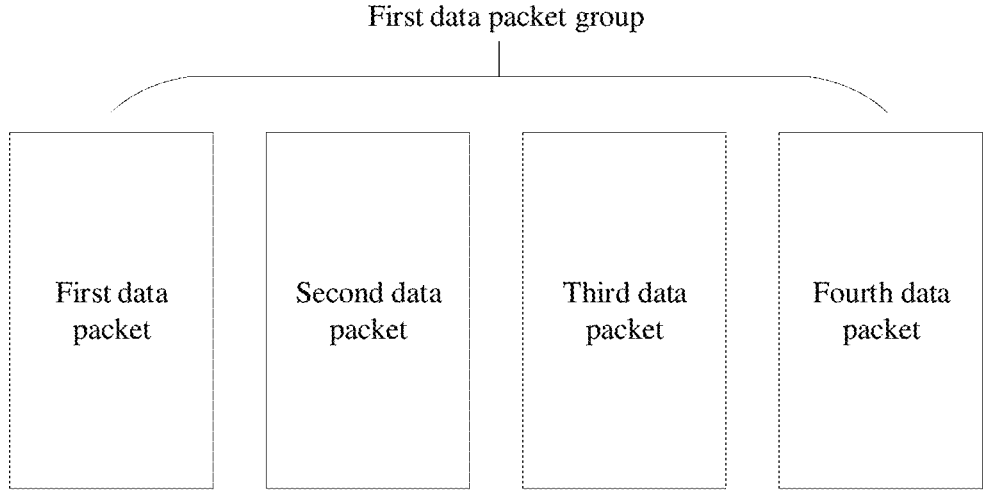
FIG. 2 is a schematic of data packets and a data packet group.

For a media service such as XR, when media coding is performed (for example, H.263, H.264, and MPEG4), a service data flow of the media service is generally formed by a series of media units (MU). Each media unit represents a complete data unit at an application layer, and includes one or more data packets such as an IP packet. These data packets are strongly correlated and have a transmission requirement of integrity. When one or more of the data packets fail to be transmitted, a receive end may fail to decode the entire media unit. In some embodiments, the media unit may also be referred to as a data packet group, a frame (for example, a key frame I-frame, a forward differential frame P-frame, or a bidirectional differential frame B-frame), a data slice, an application layer data unit, a data unit, or the like. For example, as shown in FIG. 2, a first data packet group includes a first data packet, a second data packet, a third data packet, and a fourth data packet, and forms a media unit. When one or more data packets in the foregoing data packets fail to be transmitted, a receive end may not be able to decode the first data packet group, thereby affecting experience of an XR service.

Further, a plurality of data packet groups of the XR service may be associated. When a data packet group fails to be decoded, other data packet groups may also fail to be decoded. For example, if an I-frame fails to be decoded, subsequent P-frames and B-frames may all fail to be decoded.

Figure 3:
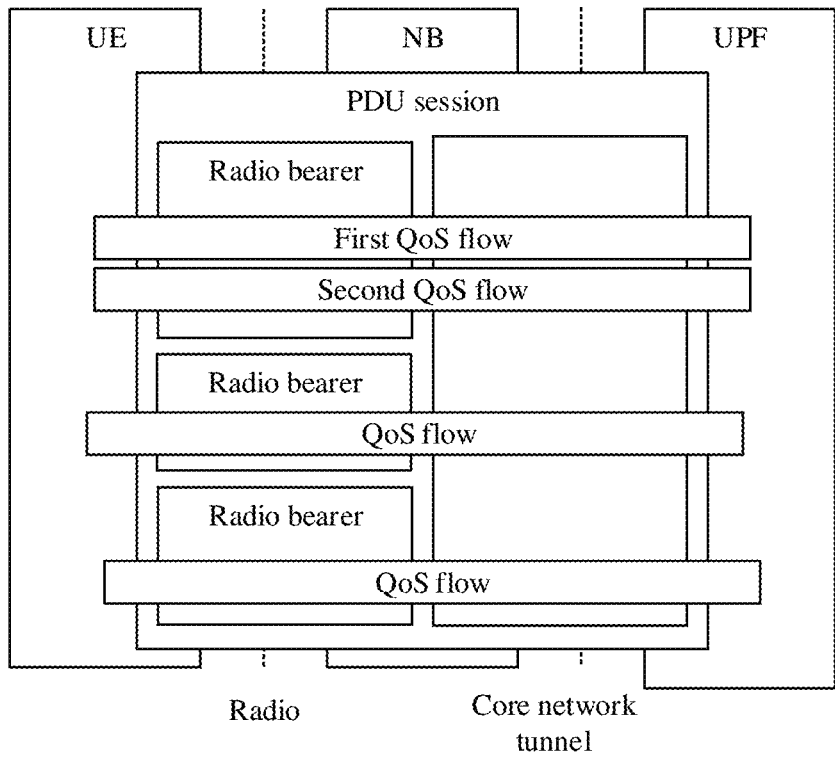
FIG. 3 is a schematic of a QoS flow in a PDU session.

2. Quality of service (QoS) is a technology used to solve problems such as network delay and congestion. When network congestion occurs, data may be discarded. To meet different QoS requirements of a user for different applications, the network needs to allocate and schedule resources based on user requirements and provide different kinds of QoS for different pieces of data. In a 5G system, a flow-based QoS model is used. Data mapped to a same QoS flow receives same forwarding treatment. As shown in FIG. 3, a PDU session is established between UE and a UPF, a radio bearer is between the UE and an NB, and a core network tunnel is between the NB and the UPF. The PDU session includes a plurality of QoS flows, and the plurality of QoS flows include a first QoS flow, a second QoS flow, and the like. The plurality of QoS flows may be used for transmitting data flows of different services, or may be used for transmitting data flows of a same service. For example, the first QoS flow is used for transmitting a data flow of a first service, and the second QoS flow is used for transmitting a data flow of a second service; or the first QoS flow is used for transmitting a first data flow of the first service, and the second QoS flow is used for transmitting a second data flow of the first service.

3. A QoS parameter is a QoS requirement associated with QoS, including but not limited to QoS parameters, QoS characteristics, and the like. The QoS parameter may also be referred to as a QoS flow level QoS parameter, a QoS reference, a QoS flow description, QoS information, or the like. In other words, QoS parameters can be used to quantify QoS requirements. In embodiments of this disclosure, QoS parameters not only include data packet-based QoS parameters, but also define new data packet group-based QoS parameters, correlated QoS parameters, and mixed QoS parameters.

The data packet-based QoS parameters may include one or more of the following: 5G QoS identifier (5QI), allocation and retention priority (ARP), reflective QoS attribute (RQA), notification control, flow bit rates (FBR), aggregate bit rates (ABR), default values, maximum packet loss rate (MPLR), resource type, priority level (PL), packet delay budget (PDB), packet error rate (PER), averaging window, maximum data burst volume (MDBV), and the like. The resource type includes a guaranteed bit rate (GBR) and a non guaranteed bit rate (Non-GBR). The data packet-based QoS parameters are currently used QoS parameters, and details are not described herein again.

For details about the data packet group-based QoS parameters, correlated QoS parameters, and mixed QoS parameters, refer to the following description.

Currently, because data carried in a QoS flow is controlled by using a data packet as a granularity, some services that have a requirement for high-rate and low-latency transmission cannot be met. An XR service is used as an example. For example, data generated by the XR service includes three data packet groups, where the three data packet groups are a first data packet group, a second data packet group, and a third data packet group, and each data packet group includes 100 data packets. The first data packet group is associated with the second data packet group, and the first data packet group is associated with the third data packet group. That is, when the first data packet group cannot be decoded, the second data packet group and the third data packet group cannot be decoded. A first QoS flow is used for transmitting the XR service, and a QoS parameter corresponding to the first QoS flow includes a packet error rate (packet error rate, PER). If the PER is 0.03, it may be understood that an upper bound for data packets erroneously transmitted when the XR service is transmitted on the first QoS flow is 9. In other words, a QoS requirement of the first QoS flow can be met only when it is ensured that less than nine data packets are erroneously transmitted when the XR service is transmitted on the first QoS flow. However, because the first data packet group is associated with the second data packet group, and the first data packet group is associated with the third data packet group, if a data packet in the first data packet group is erroneously transmitted, a receive end cannot decode the first data packet group, and even if less than nine data packets are erroneously transmitted on the first QoS flow, the receive end still cannot decode the foregoing three data packet groups. Consequently, a waste of network resources is caused, and user experience is affected.

In conclusion, a current method for controlling, by using a data packet as a granularity, data carried on a QoS flow cannot meet some services that have a high-rate and low-latency transmission requirement. Based on this, this application proposes a QoS management method, to control a QoS flow by using a data packet group as a granularity, so as to avoid a waste of network resources and improve user experience.

Figure 4:
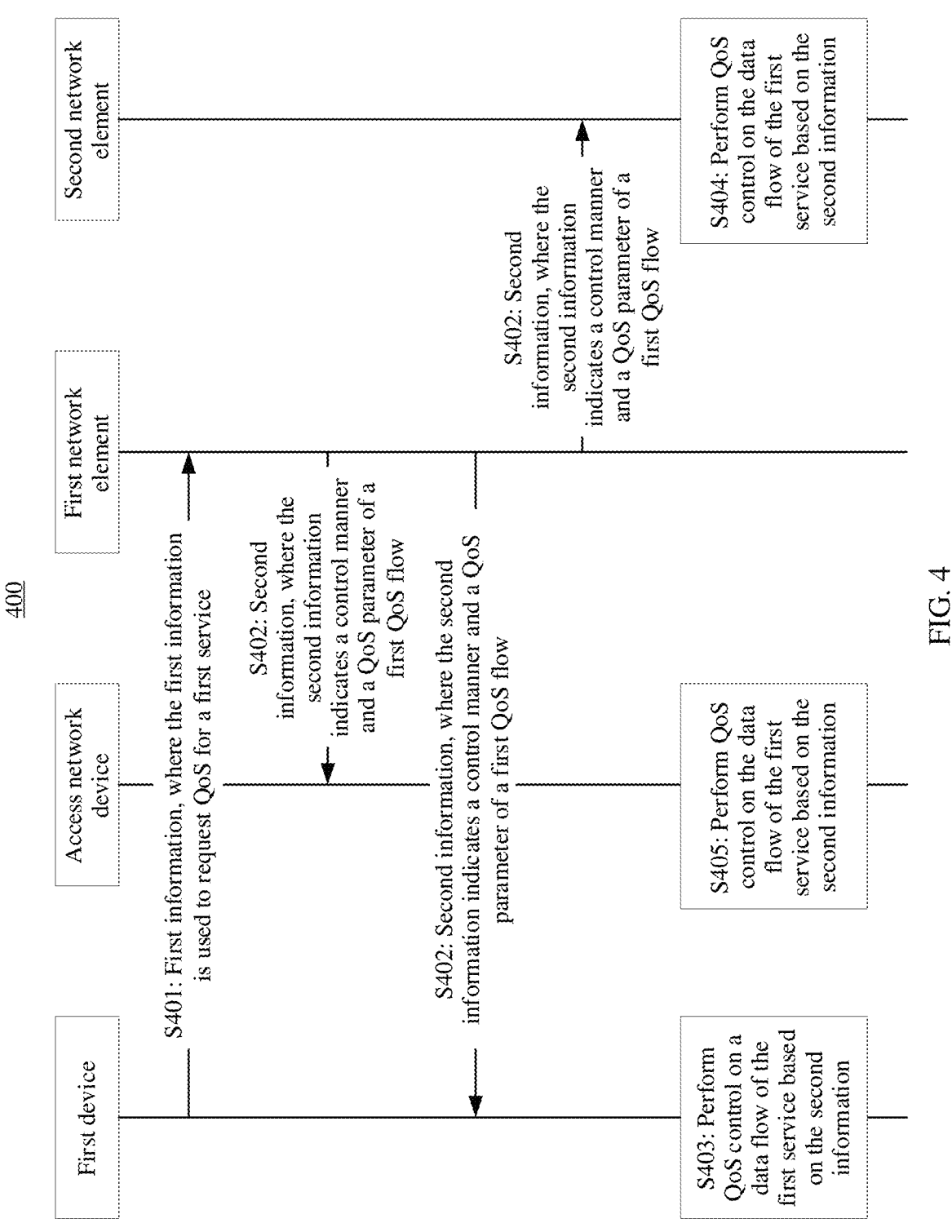
FIG. 4 is a schematic flowchart of a QoS management method according to this disclosure.

FIG. 4 is a schematic flowchart of a QoS management method 400 according to this disclosure.

S401: A first device sends first information to a first network element, where the first information is used to request QoS for a first service.

Correspondingly, the first network element receives the first information sent by the first device.

Specifically, the first device sends the first information to the first network element, where the first information is used to request the QoS for the first service.

In a possible implementation, the first information includes request information and at least one of an identifier (for example, an application program identifier), a 5-tuple (a source IP address, a source port number, a target IP address, a target port number, and a transport layer protocol), and a triplet (a target IP address, a target port number, and a transport layer protocol) of the first service, and the request information is used to request the QoS for the first service.

Optionally, in another possible implementation, the request information is further used to request a QoS flow control manner. The QoS flow control manner includes a first control manner for controlling based on a data packet group and a second control manner for controlling based on a data packet. The first control manner for controlling based on a data packet group may be understood as performing QoS control at a granularity of a data packet group. For example, 100 data packets are transmitted on a QoS flow, the first 50 data packets of the 100 data packets are a first data packet group, and the last 50 data packets are a second data packet group. When data needs to be discarded, if the first control manner is used, the first data packet group and/or the second data packet group are/is discarded at a granularity of a data packet group; or if the second control manner is used, one or more data packets in the 100 data packets are discarded at a granularity of a data packet. For ease of description, in the following, the first control manner is control based on a data packet group, and the second control manner is control based on a data packet.

The request information may be used to directly request a QoS flow control manner or indirectly request a QoS flow control manner.

In some embodiments, the request information may be used to indirectly request a QoS flow control manner. For example, the request information is used to request a QoS parameter. It may be understood that when the request information is used to request a data packet group-based QoS parameter, a QoS control manner requested by using the request information is the first control manner. Similarly, when the request information is used to request a data packet-based QoS parameter, the QoS control manner requested by using the request information is the second control manner. When the request information is used to request a mixed QoS parameter, the QoS control manner may be determined based on the mixed QoS parameter requested by using the request information (for example, based on a 5QI value of the mixed QoS parameter). For details, refer to the following description.

It should be understood that the data packet group-based QoS parameter and the mixed QoS parameter are two new QoS parameters provided in embodiments of this disclosure. The following describes in detail the data packet group-based QoS parameter and the mixed QoS parameter provided in embodiments of this disclosure.

The data packet group-based QoS parameter may include one or more of the following: a group-5G QoS identifier (G-5QI), a group priority level (GPL), a group delay budget (GDB), a group error rate (GER), an aggregation group error rate (AGER), a maximum group loss rate (MGLR), a maximum aggregation group loss rate (MAGLR), an averaging window, and a maximum data burst volume.

It should be understood that names of the foregoing data packet group-based QoS parameters are merely examples, but are not limited thereto. For example, the group-5G QoS identifier may also be referred to as a media unit 5G QoS identifier (MU-5QI), the group priority level may also be referred to as a media unit priority level (MUPL), the group delay budget may also be referred to as a media unit delay budget (MUDB), the group error rate may also be referred to as a media unit error rate (MUER), the aggregation group error rate may also be referred to as an aggregation media unit error rate (AMUER), the maximum group loss rate may also be referred to as a maximum media unit loss rate (MMULR), and the maximum aggregation group loss rate may also be referred to as a maximum aggregation media unit loss rate (MAMULR).

The group priority level indicates a priority level of a data packet group, and different data packet groups of a data flow of a same service may have different priority levels. For example, an application server may define importance of different data packet groups, and data packet groups of different importance may correspond to different GPLs. Similarly, the media unit priority level indicates a priority level of a media unit, and different media units of a same service may have different priority levels.

The group delay budget indicates an upper bound for a time that a data packet group is delayed between a terminal device and an anchor UPF. The group delay budget may be understood as guaranteeing a delay with all data packets in a data group as a whole, that is, a delay of each data packet in the data group is a sum of the GDB and a time of arrival of the last data packet in the data packet group. For example, if the $1^{st}$ data packet in a first data packet group arrives at 1 ms, the last data packet arrives at 2 ms, and a group delay budget is 10 ms, all data packets in the first data packet group need to arrive at a receive end before 12 ms. Similarly, the media unit delay budget indicates an upper bound for a time that a media unit is delayed between a terminal device and an anchor UPF, that is, a delay of each data packet in the media unit is a sum of the media unit delay budget and a time of arrival of the last data packet of the media unit.

The group error rate indicates an upper bound for a rate of data packet group transmission errors, which may also be understood as an upper bound for data packet groups that are not successfully delivered. When a transmission error occurs in one or more data packets in a data packet group and therefore the data packet group cannot be decoded, the data packet group may be determined as a transmission error, which counts towards the group error rate. For example, the group error rate is 0.02. If a data flow transmitted on a first QoS flow includes 1000 data packet groups, it needs to be ensured that less than 20 data packet groups are erroneously transmitted on the first QoS flow. Similarly, the media unit error rate indicates an upper bound for a rate of media unit transmission errors, which may also be understood as an upper bound for media units that are not successfully delivered.

The aggregation group error rate indicates an upper bound for a rate of transmission errors of importance-based data packet groups, which may also be understood as an upper bound for weighted data packet groups that are not successfully delivered. Data packet groups have different levels of importance, and data packet groups with different levels of importance may be corresponding to different weight factors. Weight factors and a quantity of data packet groups that are erroneously transmitted are both taken into account for calculation. For example, if a weight factor corresponding to a first data packet group is 0.5, when the first data packet group is erroneously transmitted, it may be counted as a transmission error of 0.5 data packet groups. For another example, if a weight factor corresponding to a second data packet group is 1, when the second data packet group is erroneously transmitted, it may be counted as a transmission error of 1 data packet group. For example, the AGER is 0.02. It is assumed that the data flow transmitted on the first QoS flow includes 1000 data packet groups, 15 data packet groups whose weight factors are 1 are erroneously transmitted, and 10 data packet groups whose weight factors are 0.4 are erroneously transmitted. In this case, 19 data packet groups are counted as being erroneously transmitted, and the first QoS flow meets the aggregation group error rate. Similarly, the aggregation media unit error rate indicates an upper bound for a rate of transmission errors of importance-based media units, which may also be understood as an upper bound for weighted media units that are not successfully delivered.

The maximum group loss rate indicates an upper bound for data packet group losses, which may also be understood as an upper bound for lost data packet groups that can be tolerated. When one or more data packets in a data packet group are lost and therefore the data packet group cannot be decoded, the data packet group may be determined as a loss, which counts towards the maximum group loss rate. For example, the maximum group loss rate is 0.02. If the data flow transmitted on the first QoS flow includes 1000 data packet groups, it needs to be ensured that less than 20 data packet groups are lost on the first QoS flow. Similarly, the maximum media unit loss rate indicates an upper bound for media unit losses, which may also be understood as an upper bound for lost media units that can be tolerated.

In some embodiments of this disclosure, when a type of the QoS flow is a guaranteed bit rate (Guaranteed Bit Rate, GBR) QoS flow, the group loss rate may be used.

The maximum aggregation group loss rate indicates an upper bound for transmission losses of importance-based data packet groups, which may also be understood as an upper bound for lost weighted data packet groups that can be tolerated. Data packet groups have different levels of importance, and data packet groups with different levels of importance may be corresponding to different weight factors. Weight factors and a quantity of data packet groups that are lost in transmission are both taken into account for calculation. For example, if a weight factor corresponding to a first data packet group is 0.5, when the first data packet group is lost in transmission, a transmission loss of 0.5 data packet groups may be counted. For another example, if a weight factor corresponding to a second data packet group is 1, when the second data packet group is lost in transmission, a transmission loss of 1 data packet group may be counted. For example, the maximum aggregation group loss rate is 0.02. It is assumed that the data flow transmitted on the first QoS flow includes 1000 data packet groups, 15 data packet groups whose weight factors are 1 are lost in transmission, and 10 data packet groups whose weight factors are 0.4 are lost in transmission. In this case, 19 data packet groups may be counted as being lost in transmission, and the first QoS flow meets the maximum aggregation group loss rate. Similarly, the maximum aggregation media unit loss rate indicates an upper bound for transmission losses of importance-based media units, which may also be understood as an upper bound for lost weighted media units that can be tolerated.

It should be understood that, for descriptions of the media unit, refer to descriptions of the data packet group. For brevity, details are not described herein again.

The G-5QI is an index value used for associating one or more data packet group-based QoS parameters. For example, Table 1 shows data packet group-based QoS parameters. As shown in Table 1, when the G-5QI is 100, the type of the QoS flow is Non-GBR, the group priority level is 68, the group delay budget is 20 ms, and the aggregation group error rate or the group error rate is 0.01. When the G-5QI is 101, the type of the QoS flow is GBR, the group priority level is 25, the group delay budget is 20 ms, and the aggregation group error rate or group error rate is 0.01.

In some embodiments, when a weight factor of a data packet group can be determined, an aggregation group error rate may be used; or when a weight factor of a data packet group cannot be determined, a group error rate may be used. Similarly, when a weight factor of a data packet group can be determined, a maximum aggregation group loss rate may be used; or when a weight factor of a data packet group cannot be determined, a maximum group loss rate may be used.

or more of the following: 5G QoS identifier (5QI), allocation and retention priority (ARP), reflective QoS attribute (RQA), notification control, flow bit rates, aggregate bit rates, default values, maximum loss rate (MLR), resource type, priority level (PL), delay budget (DB), error rate (ER), averaging window, Maximum data burst volume, and the like.

In a possible implementation, a type of a QoS parameter may be determined based on a value of a 5QI. Table 2 shows a form of a mixed QoS parameter. For example, when a value of a 5QI is 1 to 100, a QoS parameter associated with the 5QI is a data packet-based QoS parameter. For example, when the value of the 5QI is 1, an error rate is essentially equivalent to a packet error rate. When a value of a 5QI is 200 to 300, a QoS parameter associated with the 5QI is a data packet group-based QoS parameter. For example, when the value of the 5QI is 200, an error rate is essentially equivalent to a group error rate. In other words, a value of a 5QI may indicate a QoS flow control manner. For example, when a network device or a terminal device receives a 5QI whose value is 1, the network device or the terminal device may control a QoS flow by using a data packet as a granularity, and a QoS requirement of the QoS flow is a QoS parameter corresponding to the 5QI that is equal to 1; or when the network device or the terminal device receives a 5QI whose value is 200, the access network device may control a QoS flow by using a data packet group as a granularity, and a QoS requirement of the QoS flow is a QoS parameter corresponding to the 5QI that is equal to 200.

It may be understood that when the request information is used to request a QoS parameter corresponding to a 5QI that is equal to 200, a QoS control manner requested by using the request information is the first control manner.

It should be noted that when a value of a 5QI ranges from 1 to 100, a QoS parameter associated with the 5QI is a data packet-based QoS parameter, or when a value of a 5QI

TABLE 1

| Data packet group-based QoS parameters | | | | | | | |
|---|---|---|---|---|---|---|---|
| Group 5G QoS identifier | Resource type | Group priority level | Group delay budget | Aggregation group error rate/Group error rate | Maximum data burst volume | Averaging window | Service example |
| 100 | Non-GBR | 68 | 20 ms | $10^{-2}$ | N/A | N/A | Interactive service |
| 101 | GBR | 25 | 20 ms | $10^{-2}$ | 63000 bytes | 2000 ms | Interactive service |

Alternatively, this application further proposes a mixed QoS parameter. The mixed QoS parameter includes a data packet-based QoS parameter and a data packet group-based QoS parameter. The mixed QoS parameter may include one ranges from 200 to 300, a QoS parameter associated with the 5QI is a data packet group-based QoS parameter. This is merely an example, and this is not limited in embodiments of this disclosure.

TABLE 2

| 5G QoS identifier | Resource type | Priority level | Delay budget | Error rate | Maximum data burst volume | Averaging window | Service example |
|---|---|---|---|---|---|---|---|
| | | | Mixed QoS parameter | | | | |
| 1 | Non-GBR | 68 | 10 ms | 0.0001 | N/A | N/A | Interactive service |
| . . . 100 | GBR | 25 | 10 ms | 0.0001 | N/A | N/A | Interactive service |
| . . . 200 | Non-GBR | 68 | 15 ms | 0.01 | N/A | N/A | Interactive service |
| . . . 300 | GBR | 25 | 15 ms | 0.01 | 63000 bytes | 2000 ms | Interactive service |

In a possible implementation, the mixed QoS parameter may further include a control mode (control mode). The control mode indicates a QoS flow control manner. Table 3 shows a form of a mixed QoS parameter. For example, when the value of the 5QI is 1, the control mode is packet, that is, it indicates that the QoS flow control manner is data packet-based control, and a corresponding QoS parameter is a data packet-based QoS parameter. For another example, when the value of the 5QI is 200, the control mode is group (or media unit), that is, it indicates that the QoS flow control manner is data packet group-based control, and a corresponding QoS parameter is a data packet group-based QoS parameter. In other words, a value of a 5QI may indicate a QoS flow control manner. For example, when a value of a 5QI received by the network device or the terminal device is 1, the network device or the terminal device may control a QoS flow by using a data packet as a granularity; or when a value of a 5QI received by the network device or the terminal device is 200, the network device or the terminal device may control a QoS flow by using a data packet group as a granularity.

It may be understood that, when the control mode corresponding to the QoS parameter requested by using the request information is group, the QoS control manner requested by using the request information is the first control manner.

TABLE 3

| 5G QoS identifier | Control mode | Resource type | Priority level | Delay budget | Error rate | Maximum data burst volume | Averaging window | Service example |
|---|---|---|---|---|---|---|---|---|
| | | | | Mixed QoS parameter | | | | |
| 1 | Packet | Non-GBR | 68 | 10 ms | 0.0001 | N/A | N/A | Interactive service |
| . . . 100 | Packet | GBR | 25 | 10 ms | 0.0001 | N/A | N/A | Interactive service |
| . . . 200 | Group | Non-GBR | 68 | 15 ms | 0.01 | N/A | N/A | Interactive service |
| . . . 300 | Group | GBR | 25 | 15 ms | 0.01 | 63000 bytes | 2000 ms | Interactive service |

In a possible implementation, a type of a mixed QoS parameter may be indicated by using indication information. Table 4 shows a form of a mixed QoS parameter. For example, 5QI=1 is used as an example. When the indication information indicates that the QoS flow control manner is data packet-based control, a QoS parameter corresponding to the 5QI that is equal to 1 may be understood as a data packet-based QoS parameter. When the indication information indicates that the QoS flow control manner is data packet group-based control, a QoS parameter corresponding to the 5QI that is equal to 1 may be understood as a data packet group-based QoS parameter.

TABLE 4

| | | | | | Mixed QoS parameter | | |
| 5G QoS identifier | Resource type | Priority level | Delay budget | Error rate | Maximum data burst volume | Averaging window | Service example |
| --- | --- | --- | --- | --- | --- | --- | --- |
| 1 | Non-GBR | 68 | 10 ms | 0.0001 | N/A | N/A | Interactive service |
| . . . | | | | | | | |
| 100 | GBR | 25 | 10 ms | 0.0001 | N/A | N/A | Interactive service |
| . . . | | | | | | | |
| 200 | Non-GBR | 68 | 15 ms | 0.01 | N/A | N/A | Interactive service |
| . . . | | | | | | | |
| 300 | GBR | 25 | 15 ms | 0.01 | 63000 bytes | 2000 ms | Interactive service |

It should be noted that, in this embodiment of this disclosure, a mixed QoS parameter may be used to replace a data packet group-based QoS parameter and a data packet-based QoS parameter. Therefore, the mixed QoS parameter may also be referred to as a QoS parameter.

In some other embodiments, the request information may be used to directly request a QoS control manner. For example, the request information includes a first parameter, the first parameter may be one bit or several bits, and the first parameter indicates a requested QoS control manner. For example, the request information includes a first parameter, and the first parameter is one bit, where 0 indicates to request the first control manner, and 1 indicates to request the second control manner.

S402: The first network element sends second information, where the second information indicates a control manner and a QoS parameter of the first QoS flow, the first QoS flow is used for transmitting a data flow of the first service, and the QoS control manner includes a first control manner for controlling based on a data packet group.

Specifically, after receiving the first information, the first network element may determine the control manner and the QoS parameter of the first QoS flow based on the first information, and then send one or more parameters (namely, the second information) to the first device, the access network device, and a second network element, so that the first device, the access network device, and the second network element perform QoS control on the data flow of the first service based on the second information. The second information may be one parameter, and the parameter is the QoS parameter of the first QoS flow. Alternatively, the second information may be a plurality of parameters, for example, two parameters, where one parameter indicates the control manner of the first QoS flow, and the other parameter is the QoS parameter of the first QoS flow.

Optionally, in some embodiments, the second information includes a first QoS parameter, and the first QoS parameter includes N data packet group-based QoS parameters, where N≥1 and N is a positive integer. It may be understood that the first network element may indicate the control manner of the first QoS flow by using the first QoS parameter. For example, when the first QoS parameter is a G-5QI, it indicates that the control manner of the first QoS flow is the first control manner.

For example, the first device requests the QoS for the first service. After receiving the first information, the first network element determines, based on the first information, that the control manner of the first QoS flow is the first control manner and the corresponding first QoS parameter based on a data packet group, and then sends the first QoS parameter to the first device, the access network device, and the second network element, to indicate the control manner of the first QoS flow and the corresponding QoS parameter. For example, the first network element sends a G-5QI to the first device, the access network device, and the second network element, so that the first device, the access network device, and the second network element may perform QoS control on the data flow of the first service at a granularity of a data packet group based on the G-5QI. For another example, the first network element sends a 5QI whose value is 200 to the first device, the access network device, and the second network element. The 5QI corresponds to a data packet group-based QoS parameter (for example, it is agreed in advance in a protocol that a corresponding QoS parameter is a data packet group-based QoS parameter when the 5QI is 200), so that the first device, the access network device, and the second network element can perform QoS control on the data flow of the first service at a granularity of a data packet group based on the 5QI. For another example, the first network element sends, to the first device, the access network device, and the second network element, a 5QI whose value is 200, and a control mode corresponding to the 5QI is group, so that the first device, the access network device, and the second network element can perform QoS control on the data flow of the first service at a granularity of a data packet group based on the 5QI.

For example, the first device requests the first control manner for controlling based on a data packet group. After receiving the first information, the first network element determines, based on the first information, that the control manner of the first QoS flow is the first control manner and the corresponding first QoS parameter based on a data packet group, and then sends the first QoS parameter to the first device, the access network device, and the second network element, to indicate the control manner of the first QoS flow and the corresponding QoS parameter. For example, the first network element sends a G-5QI to the first device, the access network device, and the second network element, so that the first device, the access network device, and the second network element may perform QoS control on the data flow of the first service at a granularity of a data packet group based on the G-5QI. For another example, the first network element sends a 5QI whose value is 200 to the first device, the access network device, and the second network element. The 5QI corresponds to a data packet group-based QoS parameter (for example, it is agreed in advance in a protocol that a corresponding QoS parameter is a data packet group-based QoS parameter when the 5QI is 200), so that the first device, the access network device, and the second network element can perform QoS control on the data flow of the first service based on the 5QI by using a data packet group as a granularity. For another example, the first network element sends, to the first device, the access network device, and the second network element, a 5QI whose value is 200, and a control mode corresponding to the 5QI is group, so that the first device, the access network device, and the second network element can perform QoS control on the data flow of the first service at a granularity of a data packet group based on the 5QI.

For example, the first device requests the second control manner for controlling based on a data packet. After receiving the first information, the first network element may determine, based on a feature of the first service, that the control manner of the first QoS flow is the first control manner for controlling based on a data packet group and the corresponding first QoS parameter based on a data packet group. For example, when the first network element determines that the first service is a media service such as an XR service, it may be determined that a control method of the first QoS flow is the first control manner. In other words, the first network element may finally determine the control manner of the first QoS flow based on a feature of the service, and then indicate the control manner of the first QoS flow by using the first QoS parameter. For example, the first network element sends a G-5QI to the first device, the access network device, and the second network element, so that the first device, the access network device, and the second network element may perform QoS control on the data flow of the first service at a granularity of a data packet group based on the G-5QI. For another example, the first network element sends a 5QI whose value is 200 to the first device, the access network device, and the second network element. The 5QI corresponds to a data packet group-based QoS parameter (for example, it is agreed in advance in a protocol that a corresponding QoS parameter is a data packet group-based QoS parameter when the 5QI is 200), so that the first device, the access network device, and the second network element can perform QoS control on the data flow of the first service at a granularity of a data packet group based on the 5QI. For another example, the first network element sends, to the first device, the access network device, and the second network element, a 5QI whose value is 200, and a control mode corresponding to the 5QI is group, so that the first device, the access network device, and the second network element can perform QoS control on the data flow of the first service at a granularity of a data packet group based on the 5QI.

Optionally, in some embodiments, the second information includes first indication information and a second QoS parameter, the first indication information indicates the QoS control manner of the first QoS flow, and the second QoS parameter indicates the QoS parameter of the first QoS flow.

For example, the first device requests the first control manner for controlling based on a data packet group or the second control manner for controlling based on a data packet. After receiving the first information, the first network element determines, based on the first information, that the QoS control manner of the first QoS flow is the first control manner and the corresponding QoS parameter, and then sends the first indication information and the second QoS parameter to the first device, the access network device, and the second network element. In this way, the first device, the access network device, and the second network element can perform QoS control on the data flow of the first service based on the first indication information at a granularity of a data packet group, to meet the second QoS parameter. For example, the second QoS parameter is any row in Table 4. When the first indication information indicates control based on a data packet group, the second QoS parameter may be understood as a data packet group-based QoS parameter. For another example, the second QoS parameter is any row in Table 4. When the first indication information indicates control based on a data packet, the second QoS parameter may be understood as a data packet-based QoS parameter. For another example, the second QoS parameter is a data packet-based QoS parameter, but the second QoS parameter is a data packet-based QoS parameter applicable to the first control manner. The first network element may determine the second QoS parameter based on a relationship between a data packet and a data packet group in the data flow of the first service and/or a weight factor of the data packet group. For example, when QoS control is performed on the first QoS flow at a granularity of a data packet, the QoS parameter is 5QI=5, and the first network element may determine, based on a conversion relationship between a data packet and a data packet group, that a QoS parameter corresponding to the 5QI that is equal to 100 is suitable for performing QoS control on the first QoS flow at a granularity of a data packet group. In this case, the QoS parameter corresponding to the 5QI that is equal to 100 is the second QoS parameter.

It should be noted that the first network element may determine the relationship between the data packet and the data packet group in the data flow of the first service and/or the weight factor of the data packet group in the following manners.

Manner 1: A server of the first service may directly indicate the relationship between the data packet and the data packet group in the data flow of the first service and/or the weight factor. For example, the server of the first service may indicate that the data flow of the first service includes five data packet groups, the five data packet groups include 500 data packets, and weight factors corresponding to the five data packet groups are 0.5.

Manner 2: The first network element may determine the relationship between the data packet and the data packet group in the data flow of the first service and/or the weight factor by using service information of the first service. The service information includes a coding parameter of the first service and/or a weight factor of each data packet group of the first service. The coding parameter of the first service includes a frame rate, a resolution, a bit rate, and the like. The first network element may obtain the relationship between the data packet and the data packet group through calculation based on the coding parameter. For example, it is assumed that all frames of the first service have a same size, each frame is a data packet group, a size of one data packet is 10 KB, a quantity of frames transmitted per second (frames per second, FPS) of the first service is 10, and a bit rate is 10 Mbps. In this case, it may be obtained that a size of each frame of the first service is 1 MB, and a quantity of data packets included in each frame is 100.

Further, the coding parameter may further include a group of pictures (Group of picture, GoP), so that a quantity of key frames (I frames) and a quantity of auxiliary frames (P frames) of the first service may be calculated, and the key frame and the auxiliary frame may be corresponding to different weight factors. For example, a weight factor of the key frame is 1, and a weight factor of the auxiliary frame is 0.3.

For Manner 2, the method 400 further includes: The first network element obtains the service information of the first service. The first network element may obtain the service information of the first service from the first device or another network element. This is not limited in this embodiment of this disclosure.

Optionally, in some embodiments, the second information includes first indication information and a second QoS parameter, the first indication information indicates the QoS control manner of the first QoS flow, and the second QoS parameter includes at least one data packet-based QoS parameter.

For example, the first device requests a first control manner for controlling based on a data packet group or a second control manner for controlling based on a data packet. After receiving the first information, the first network element determines, based on the first information, that the QoS control manner of the first QoS flow is the first control manner and the second QoS parameter, where the second QoS parameter is a data packet-based QoS parameter. It should be noted that the second QoS parameter determined by the first network element can meet a QoS requirement of the data flow of the first service at a granularity of a data packet. After receiving the first indication information and the second QoS parameter, the first device, the second network element, and the access network device may finally determine, based on the relationship between the data packet and the data packet group in the data flow of the first service, a QoS parameter that can meet a requirement for performing QoS control at a granularity of a data packet group. For example, a packet error rate corresponding to a 5QI in the second QoS parameter determined by the first network element is 0.0001, after receiving the first indication information and the second QoS parameter, the first device, the second network element, and the access network device determine that the data flow of the first service includes 10000 data packets, and the 10000 data packets may form 100 data packet groups. In this case, the first device, the second network element, and the access network device may finally determine that the group error rate is 0.01. In other words, the first network element may first determine a QoS parameter that meets a requirement for performing QoS control at a granularity of a data packet, and the first device, the second network element, and the access network device finally determine the QoS parameter that meets the requirement for performing QoS control at a granularity of a data packet group.

For this embodiment, the method 400 further includes: The first network element sends the service information of the first service.

Optionally, in some embodiments, the first indication information specifically indicates a preferred control manner of the first QoS flow, which may also be referred to as a control manner priority level.

The first network element may indicate the preferred control manner of the first QoS flow by using the first indication information, and the first device, the second network element, and the access network device finally determine a corresponding QoS parameter based on the first indication information. For specific descriptions, refer to the following descriptions.

Optionally, in some embodiments, the second information includes second indication information, a third QoS parameter, and a fourth QoS parameter. The second indication information indicates the preferred QoS control manner of the first QoS flow, the third QoS parameter includes M data packet group-based QoS parameters, $M \geq 1$ and M is a positive integer, the fourth QoS parameter includes L data packet-based QoS parameters, and $L \geq 1$ and L is a positive integer.

The first network element may indicate the preferred QoS control manner of the first QoS flow by using the second indication information, and the first device, the second network element, and the access network device finally determine, based on the second indication information, whether to use the third QoS parameter or the fourth QoS parameter.

It should be understood that the second indication information indirectly indicates the QoS control manner of the first QoS flow by indicating the preferred QoS control manner of the first QoS flow, that is, the second information indicates the control manner of the first QoS flow.

S403: The first device performs QoS control on the data flow of the first service based on the second information.

Specifically, after receiving the second information, the first device may perform QoS control on the data flow of the first service based on the second information. The first device may perform QoS control on the data flow of the first service at a granularity of a data packet group. For example, when a data packet in a first data packet group in the data flow of the first service is lost, the first device may discard other data packets in the first data packet group. For another example, the first device may preferentially guarantee a data packet group with a high transmission proportion. For another example, the first device may preferentially guarantee a data packet group with high importance.

Optionally, in some embodiments, the second information includes a first QoS parameter, and the first QoS parameter includes N data packet group-based QoS parameters, where $N \geq 1$ and N is a positive integer.

After receiving the first QoS parameter, the first device may determine that the control manner of the first QoS flow is the first control manner for controlling based on a data packet group, and perform QoS control on the data flow of the first service based on the first QoS parameter. For descriptions of indicating the control manner of the first QoS flow by the first QoS parameter, refer to the foregoing descriptions. Details are not described herein again.

Optionally, in some embodiments, the second information includes first indication information and a second QoS parameter, the first indication information indicates the QoS control manner of the first QoS flow, and the second QoS parameter indicates the QoS parameter of the first QoS flow.

After receiving the first indication information and the second QoS parameter, the first device may perform QoS control on the data flow of the first service based on the control manner indicated by the first indication information, to meet the second QoS parameter. For descriptions of the second QoS parameter and the first indication information, refer to the foregoing descriptions. Details are not described herein again.

Optionally, in some embodiments, the second information includes first indication information and a second QoS parameter, the first indication information indicates the QoS control manner of the first QoS flow, and the second QoS parameter includes at least one data packet-based QoS parameter.

After receiving the first indication information and the second QoS parameter, the first device may perform QoS control based on the QoS control manner indicated by the first indication information. For example, when the first indication information indicates the second control manner for controlling based on a data packet, the first device may perform QoS control on the data flow of the first service at a granularity of a data packet, to meet the second QoS parameter. When the first indication information indicates the first control manner for controlling based on a data packet group, the first device may determine, based on a relationship between a data packet and a data packet group in the data flow of the first service and/or a weight factor of the data packet group, a QoS parameter applicable to control at a granularity of a data packet group, and then the first device performs QoS control on the data flow of the first service at a granularity of a data packet group, to meet the determined QoS parameter.

It should be noted that the first device may determine the relationship between the data packet and the data packet group in the data flow of the first service and/or the weight factor of the data packet group in the following manners.

Manner 1: A server of the first service may directly indicate the relationship between the data packet and the data packet group in the data flow of the first service and/or the weight factor.

Manner 2: The first device may determine the relationship between the data packet and the data packet group in the data flow of the first service and/or the weight factor by using service information of the first service.

For Manner 2, the method 400 further includes: The first device obtains the service information of the first service. The first device may obtain the service information of the first service from a core network element.

Optionally, in some embodiments, the first indication information specifically indicates a preferred control manner of the first QoS flow, which may also be referred to as a control manner priority level.

For example, after the first device receives the first indication information, when the first device supports the preferred QoS control manner indicated by the first indication information, the first device performs the QoS control manner indicated by the first indication information; or when the first device does not support the QoS control manner indicated by the first indication information, the first device performs another control manner. For example, the preferred QoS control manner indicated by the first indication information is the first control manner, the second QoS parameter is a data packet-based QoS parameter, and the first device supports the first control manner. In this case, the first device determines, based on the relationship between the data packet and the data packet group in the data flow of the first service and/or the weight factor of the data packet group, a QoS parameter meeting the first control manner. When the first device does not support the first control manner, the first device performs the second control manner, and the second QoS parameter is a QoS parameter meeting a QoS requirement.

According to the foregoing technical solution, the first device may flexibly select a proper QoS control manner, thereby improving flexibility of QoS management.

Optionally, in some embodiments, the second information includes second indication information, a third QoS parameter, and a fourth QoS parameter. The second indication information indicates the preferred QoS control manner of the first QoS flow, the third QoS parameter includes M data packet group-based QoS parameters, M≥1 and M is a positive integer, the fourth QoS parameter includes L data packet-based QoS parameters, and L≥1 and L is a positive integer.

After the first device receives the second indication information, when the first device supports the preferred QoS control manner indicated by the second indication information, the first device performs the preferred QoS control manner indicated by the second indication information; or when the first device does not support the preferred QoS control manner indicated by the second indication information, the first device performs another control manner. For example, if the preferred QoS control manner indicated by the second indication information is the first control manner, and the first device supports the first control manner, the first device performs the first control manner, and the third QoS parameter is a QoS parameter that meets the QoS requirement. When the first device does not support the first control manner, the first device performs the second control manner, and the fourth QoS parameter is a QoS parameter that meets the QoS requirement.

According to the foregoing technical solution, the first device may flexibly select a proper QoS control manner, thereby improving flexibility of QoS management.

S404: The access network device performs QoS control on the data flow of the first service based on the second information.

S405: The second network element performs QoS control on the data flow of the first service based on the second information.

It may be understood that for descriptions of performing, by the access network device and the second network element, QoS control on the data flow of the first service based on the second information, refer to S403. Details are not described herein again.

Optionally, before the first network element sends the second information, the method 400 further includes: The first network element determines the QoS control manner of the first QoS flow based on the first service, or the first network element determines the QoS control manner of the first QoS flow based on whether the first device supports the first control manner.

The first network element may determine the control manner of the first QoS flow based on a feature of the first service or whether the first device supports the first control manner. For example, when the first device does not support the first control manner, the first network element does not indicate the first device to perform the first control manner.

According to the QoS management method implemented in this disclosure, after receiving the information for requesting the QoS, the first network element may determine different QoS control manners based on the feature of the first service, and may provide a data packet group-based QoS control manner and a corresponding QoS parameter for the first service. This improves flexibility of QoS management, meets requirements of different services, improves user experience, and reduces a waste of network resources.

Figure 5:
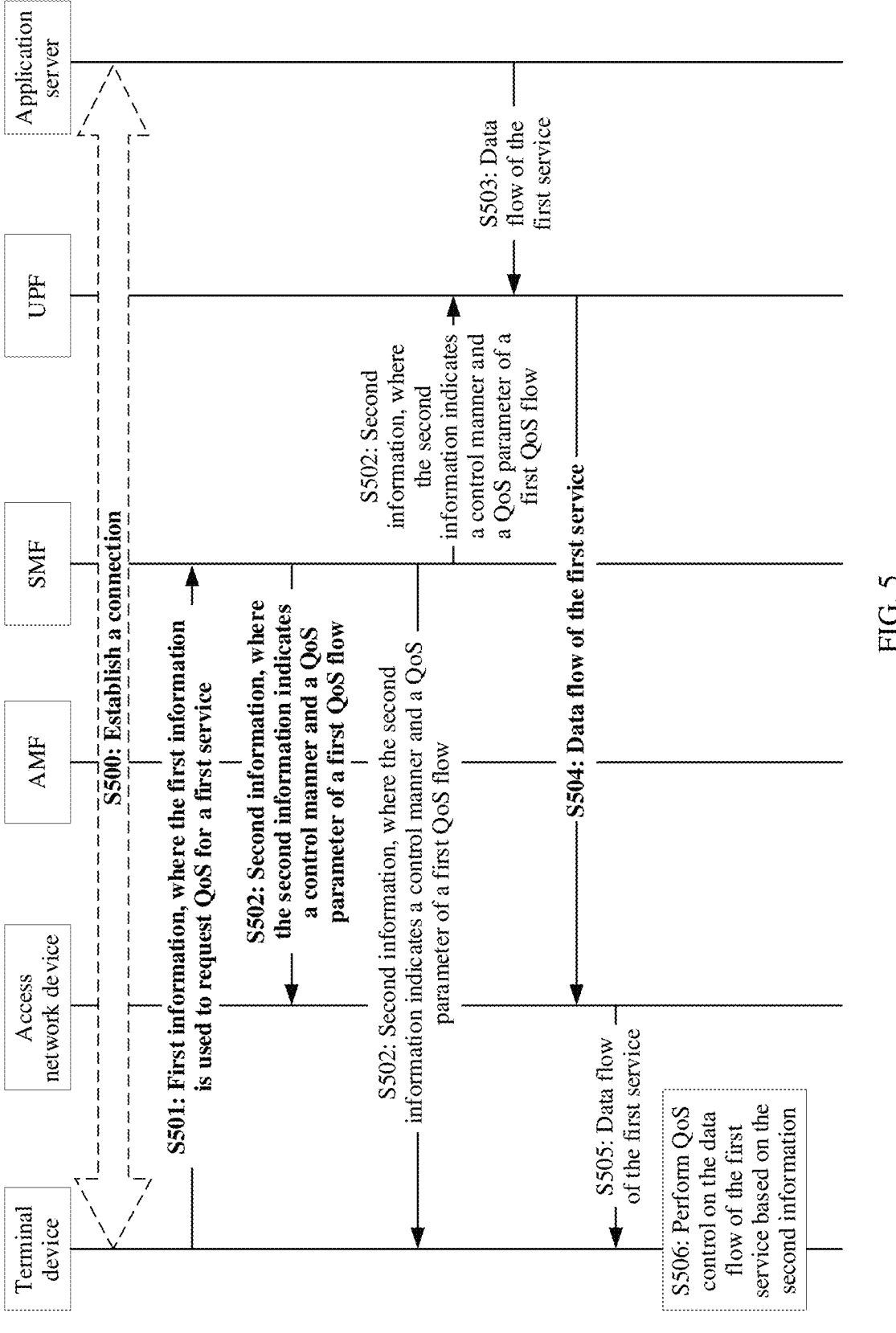
FIG. 5 is a schematic flowchart of a QoS management method according to this disclosure.

It should be understood that, in the foregoing steps S401 to S405, (1) the first network element may be an SMF; (2) the second network element may be a UPF; and (3) the first device may be a terminal device or an application server. For ease of understanding of the QoS management method provided in this disclosure, as an example rather than a limitation, the following uses an example in which the first network element is an SMF, the second network element is a UPF, and the first device is a terminal device. S401 to S405 in the method 400 are separately described in detail with reference to a specific example method shown in FIG. 5.

It should be noted that some steps mentioned below are the same as those in the foregoing method 400, and related details are not described herein again. For a specific process, refer to related steps in the method 400. The method 500 is described by using an example of downlink data.

S501: A terminal device sends first information to an SMF, where the first information is used to request QoS for a first service.

In a possible implementation, the terminal device sends the first information to the SMF via an AMF.

It should be understood that, before the terminal device sends the first information to the SMF, the terminal device has established a PDU session by using the SMF, and has established a connection to an application server by using the PDU session. In this case, the first information may be included in session modification request information for requesting to modify the PDU session.

S502: The SMF sends second information, where the second information indicates a control manner and a QoS parameter of a first QoS flow, the first QoS flow is used for transmitting a data flow of the first service, and the QoS control manner includes a first control manner for controlling based on a data packet group.

Specifically, the SMF sends the second information to the terminal device, the access network device, and the UPF.

In a possible implementation, the SMF sends the second information to the access network device via the AMF, and sends the second information to the terminal device via the AMF and the access network device. The second information may be included in a QoS profile (QoS profile) and sent to the access network device, the second information may be included in a QoS rule (QoS rule) and sent to the terminal device, and the second information may be included in a packet detection rule (Packet detection rule) and sent to the UPF device.

S503: The application server sends the data flow of the first service to the UPF.

Optionally, in some embodiments, the application server may indicate, in S503, a relationship between a data packet and a data packet group in the data flow of the first service. For example, the data flow of the first service includes 100 data packets, and the 100 data packets may form three data packet groups.

In a possible implementation, the application server adds indication information to a header of a data packet of the first service.

For example, a header of each data packet of the first service includes indication information, where the indication information indicates at least one of a data packet group to which the data packet belongs (that is, a sequence number of the data packet group to which the data packet belongs), a location of the data packet in the data packet group to which the data packet belongs (that is, a specific packet sequence number in the data packet group), a start flag (that is, the $1^{st}$ data packet in the data packet group) and an end flag (that is, the last data packet in the data packet group) of the data packet group to which the data packet belongs, and importance of the data packet group to which the data packet belongs. For example, indication information in a header of a first data packet indicates at least one of the following: The first data packet belongs to a first data packet group, the first data packet is located at a first location of the first data packet group, and the first data packet group starts from the first data packet and ends at a fourth data packet.

For example, a header of the $1^{st}$ data packet in each data packet group of the first service includes indication information, where the indication information indicates at least one of a data packet group to which the data packet belongs (that is, a sequence number of the data packet group to which the data packet belongs), a size of the data packet group to which the data packet belongs (that is, a quantity of all data packets in the data packet group), a start flag of the data packet group to which the data packet belongs (that is, the $1^{st}$ data packet in the data packet group), an end flag of a data packet group followed by the data packet group to which the data packet belongs, and importance of the data packet group to which the data packet belongs. For example, a first data packet group includes a first data packet, a second data packet, and a third data packet, and the first data packet is the $1^{st}$ data packet in the first data packet group. In this case, a header of the first data packet includes indication information, the indication information indicates at least one of the following: The first data packet belongs to the first data packet group, a size of the first data packet group is 3 (the second data packet and the third data packet belong to the first data packet group together with the first data packet), the first data packet is located at a first location of the first data packet group, and the first data packet group starts from the first data packet and ends at the third data packet.

For example, a header of the $1^{st}$ data packet and a header of the last data packet in each data packet group of the first service include indication information. The indication information indicates a data packet group to which the data packet belongs (that is, a sequence number of the data packet group to which the data packet belongs), a size of the data packet group to which the data packet belongs (that is, a quantity of all data packets in the data packet group), a flag that the indication information in the header of the $1^{st}$ data packet indicates that the data packet is a start of the data packet group to which the data packet belongs, and a flag that the indication information in the header of the last data packet indicates that the data packet is an end of the data packet group to which the data packet belongs. For example, a first data packet group includes a first data packet, a second data packet, and a third data packet, the first data packet is the $1^{st}$ data packet in the first data packet group, and the third data packet is the last data packet in the first data packet group. In this case, headers of the first data packet and the third data packet include indication information, and the indication information indicates at least one of the following: The first data packet and the third data packet belong to the first data packet group, a size of the first data packet group is 3 (the second data packet and the first data packet belong to the first data packet group together with the third data packet), the indication information in the header of the first data packet indicates that the first data packet is a start data packet of the first data packet group, and the indication information in the header of the third data packet indicates that the third data packet is an end data packet of the first data packet group.

For example, a header of the $1^{st}$ data packet of the first service includes indication information, and the indication information indicates at least one of data packet groups to which all data packets of the first service belong, a start flag and an end flag of each data packet group, and a location of each data packet in a data packet group to which the data packet belongs. For example, a first data packet is the $1^{st}$ data packet of the first service, a header of the first data packet includes indication information, and the indication information indicates that the first data packet, a second data packet, and a third data packet belong to a first data packet group, the first data packet group starts from the first data packet and ends at the third data packet, the first data packet is located at a first location of the first data packet group, the second data packet is located at a second location of the first data packet group, and the third data packet is located at a third location of the first data packet group.

Optionally, in some embodiments, the application server may further indicate, in S503, a weight factor of each data packet group in the data flow of the first service. Weight factors may correspond to different levels of importance, which may be understood as degrees of impact on a user. An XR service is used as an example. A key frame of the XR service has great impact on a user, and an auxiliary frame has small impact on the user. Therefore, a weight factor of the key frame of the XR service is greater than a weight factor of the auxiliary frame.

A description of indicating, by the application server, the weight factor of each data packet group is similar to the description of indicating, by the application server, the relationship between the data packet and the data packet group of the data flow of the first service. For brevity, details are not described herein again.

In a possible implementation, the application server may separately send one piece of indication information to indicate the relationship between the data packet group and the data packet of the first service and/or the weight factor of each data packet group.

S504: The UPF sends the data flow of the first service to the access network device.

Specifically, the UPF may send data flow of the first service to the access network device, and perform QoS control on the data flow of the first service based on the second information.

Optionally, in some embodiments, the UPF may add mark information to a header of a data packet of the first service, for example, add the mark information to a GTP-U header, to indicate a quantity of data packet groups of the first service and/or a start data packet and an end data packet of each data packet group and/or a weight factor of each data packet and/or a quantity of data packets included in each data packet group.

In a possible implementation, the UPF may obtain the mark information through an indication of the application server, that is, obtain the mark information through step S503.

In a possible implementation, the UPF may obtain the mark information based on service information of the first service.

S505: The access network device sends the data flow of the first service to the terminal device.

Specifically, after receiving the data flow of the first service that is sent by the UPF, the access network device may perform QoS control on the data flow of the first service based on the second information. For example, the access network device may schedule data packets of the first service based on a group delay budget, to ensure that a delay of data packets in a same data packet group meets the group delay budget. For another example, the access network device may schedule data packets of the first service based on a group error rate, and when a data packet in a data packet group is erroneously transmitted, the access network device discards other data packets in the data packet group. For another example, the access network device may preferentially guarantee a data packet group with a large transmission completion proportion, to avoid invalid transmission of a transmitted data packet.

S506: The terminal device performs QoS control on the data flow of the first service based on the second information.

Specifically, the terminal device may perform QoS control on the data flow of the first service based on the second information. For example, the terminal device may perform QoS control on the data flow of the first service based on a group error rate. When a data packet in a data packet group is erroneously transmitted or the terminal device fails to decode the data packet, the terminal device may not receive another data packet in the data packet group until the terminal device receives a retransmitted data packet corresponding to the data packet that fails to be transmitted or fails to be decoded.

It should be understood that, in the method 500, downlink data transmission is used as an example. However, this embodiment of this disclosure is not limited thereto. This embodiment of this disclosure may be further used to transmit uplink data. For example, the terminal device sends data of the first service to the access network device, and performs QoS control on the data flow of the first service based on the second information.

It should be understood that, when transmitting uplink data, the terminal device may indicate the relationship between the data packet and the data packet group of the first service and/or the weight factor of each data packet group in a manner similar to that of the application server.

It should be further understood that for descriptions of sending, by the terminal device, the data of the first service and performing QoS control on the data flow of the first service based on the second information, refer to the foregoing descriptions. Details are not described herein again.

According to the QoS management method implemented in this disclosure, after receiving the information for requesting the QoS, the first network element may determine different QoS control manners based on the feature of the first service, and may provide a data packet group-based QoS control manner and a corresponding QoS parameter for the first service. This improves flexibility of QoS management, meets requirements of different services, improves user experience, and reduces a waste of network resources.

As an example rather than a limitation, the following uses an example in which the first network element is an SMF, the second network element is a UPF, and the first device is an application server. S401 to S405 in the method 400 are separately described in detail with reference to a specific example method shown in FIG. 6.

S601: An application server sends first information to an SMF, where the first information is used to request QoS for a first service.

In a possible implementation, the application server sends the first information to the SMF via a PCF.

In a possible implementation, the application server sends the first information to the SMF via an NEF and the PCF.

It should be understood that, before the application server sends the first information to the SMF, the application server has established a connection to a terminal device by using a PDU session, and the first information may be included in session modification request information.

S602: The SMF sends second information, where the second information indicates a control manner and a QoS parameter of a first QoS flow, the first QoS flow is used for transmitting a data flow of the first service, and the QoS control manner includes a first control manner for controlling based on a data packet group.

S603: The application server sends the data flow of the first service to a UPF.

S604: The UPF sends the data flow of the first service to an access network device.

S605: The access network device sends the data flow of the first service to a terminal device.

S606: The terminal device performs QoS control on the data flow of the first service based on the second information.

It should be understood that, for descriptions of steps S602 to S606, refer to the foregoing descriptions. For brevity, details are not described herein again.

According to the QoS management method implemented in this disclosure, after receiving the information for requesting the QoS, the first network element may determine different QoS control manners based on the feature of the first service, and may provide a data packet group-based QoS control manner and a corresponding QoS parameter for the first service. This improves flexibility of QoS management, meets requirements of different services, improves user experience, and reduces a waste of network resources.

It should be noted that, in the foregoing methods 400 to 600, the terminal device has established a connection to the application server before sending the first information, or the application server has established a connection to the terminal device before sending the first information. However, this disclosure is not limited thereto. For example, the terminal device may send the first information when establishing a connection to the application server, so that the terminal device can perform a corresponding QoS control manner after establishing the connection to the application server.

In the foregoing method, an example in which the data flow of the first service is carried by one QoS flow is used. However, this disclosure is not limited thereto. For example, the data flow of the first service may be carried by two QoS flows, and correlated control may be performed on the two QoS flows. The following describes in detail a QoS management method for performing correlated QoS control on a plurality of QoS flows.

FIG. 7 is a schematic flowchart of a QoS management method 700 according to this disclosure.

S701: A first device sends third information, where the third information is used to request QoS for a second service.

Specifically, the first device sends the third information to the first network element, where the third information is used to request the QoS for the second service.

In a possible implementation, the third information includes request information and at least one of an identifier (for example, an application program identifier), a 5-tuple (a source IP address, a source port number, a target IP address, a target port number, and a transport layer protocol), and a triplet (a target IP address, a target port number, and a transport layer protocol) of the second service, and the request information is used to request the QoS for the second service.

Optionally, in another possible implementation, the request information is further used to request a QoS flow control manner. For example, the request information may be used to request to perform correlated QoS control on the data flow of the second service. The correlated QoS control may be understood as performing QoS control on a plurality of QoS flows that have an association relationship, so that the plurality of QoS flows jointly meet a corresponding QoS parameter. It is assumed that there is an association relationship between a second QoS flow and a third QoS flow, a data flow transmitted on the second QoS flow includes 1000 data packets, and a data flow transmitted on the third QoS flow includes 1000 data packets. If correlated QoS control is performed on the second QoS flow and the third QoS flow to make lost data packets less than 40, a sum of a quantity of lost data packets on the second QoS flow and a quantity of lost data packets on the third QoS flow needs to be less than 40.

In some embodiments, the request information is used to request a correlated QoS parameter. It may be understood that, when the request information is used to request a correlated QoS parameter, the QoS control manner requested by using the request information is correlated QoS control. The following describes in detail the correlated QoS parameter provided in embodiments of this disclosure.

The correlated QoS parameter is a QoS requirement of a plurality of QoS flows that have an association relationship. QoS flows having an association relationship may be understood as: Data flows transmitted on the QoS flows have an association relationship. For example, there is an association relationship between a first QoS flow and a second QoS flow, where the first QoS flow is used for transmitting a first data flow of the second service, and the second QoS flow is used for transmitting a second data flow of the second service.

The correlated QoS parameter may include one or more of the following: a correlated QoS flow 5G QoS identifier (Correlated QoS flow 5G QoS Identifier, CQF-5QI), a correlated QoS flow error rate (Correlated QoS flow Error Rate, CQF-ER), a correlated QoS flow aggregation error rate (Correlated QoS flow Aggregation Error Rate, CQF-AER), a correlated QoS flow maximum loss rate (Correlated QoS flow Maximum Loss Rate, CQF-MLR), a correlated QoS flow maximum aggregation loss rate (Correlated QoS flow Maximum Aggregation Loss Rate, CQF-MALR), a correlated QoS flow maximum bit rate (Correlated QoS flow Maximum Bit Rate, CQF-MBR), and a correlated QoS flow aggregation maximum bit rate (Correlated QoS flow Aggregation Maximum Bit Rate, CQF-AMBR). The correlated QoS parameters are described in detail below.

The correlated QoS flow error rate indicates an upper bound for a rate of transmission errors of data packet groups or data packets in QoS flows having an association relationship, which may also be referred to as an upper bound for data packet groups or data packets that are not successfully delivered. When a data packet is erroneously transmitted on QoS flows having an association relationship, the data packet may be determined as a transmission error; or when a data packet group is erroneously transmitted (for example, a data packet in the data packet group is lost) on QoS flows having an association relationship, the data packet group may be determined as a transmission error. For example, the correlated QoS flow error rate is 0.02. It is assumed that there is an association relationship between a first QoS flow and a second QoS flow, a data flow transmitted on the first QoS flow includes 1000 data packets, and a data flow transmitted on the second QoS flow includes 1000 data packets. In this case, it needs to be ensured that less than 40 data packets are erroneously transmitted on the first QoS flow and the second QoS flow. Alternatively, a data flow transmitted on the first QoS flow includes 1000 data packet groups, and a data flow transmitted on the second QoS flow includes 1000 data packet groups. In this case, it needs to be ensured that less than 40 data packet groups are erroneously transmitted on the first QoS flow and the second QoS flow.

The correlated QoS flow aggregation error rate indicates an upper bound for a rate of transmission errors of importance-based data packet groups or data packets in QoS flows having an association relationship, which may also be understood as an upper bound for weighted data packet groups or weighted data packets that are not successfully delivered. Data packet groups or data packets have different levels of importance. Data packet groups and data packets with different levels of importance may correspond to different weight factors, and weight factors and a quantity of data packet groups or data packets that are erroneously transmitted are both taken into account for calculation. For example, if a weight factor corresponding to a first data packet group transmitted on QoS flows having an association relationship is 0.5, when the first data packet group is erroneously transmitted, it may be counted as a transmission error of 0.5 data packet groups. For another example, if a weight factor corresponding to a second data packet group is 1, when the second data packet group is erroneously transmitted, it may be counted as a transmission error of 1 data packet group. For example, the correlated QoS flow aggregation error rate is 0.02. It is assumed that there is an association relationship between a first QoS flow and a second QoS flow, a data flow transmitted on the first QoS flow includes 1000 data packet groups, and a data flow transmitted on the second QoS flow includes 1000 data packet groups. On the first QoS flow, 10 data packet groups whose weight factors are 1 are erroneously transmitted, and five data packet groups whose weight factors are 0.4 are erroneously transmitted. On the second QoS flow, five data packet groups whose weight factors are 1 are erroneously transmitted, and five data packet groups whose weight factors are 0.4 are erroneously transmitted. In this case, 19 data packet groups may be counted as being erroneously transmitted, and the first QoS flow meets the correlated QoS flow aggregation error rate. Similarly, for a case in which data packets are transmitted on QoS flows having an association relationship, refer to the foregoing description. Details are not described herein again.

The correlated QoS flow loss rate indicates an upper bound for lost data packet groups or data packets on QoS flows having an association relationship, which may also be understood as an upper bound for lost data packet groups or data packets that can be tolerated. When a data packet on QoS flows having an association relationship is lost, it may be determined that the data packet is lost; or when a data packet group (for example, a data packet of the data packet group is lost) on QoS flows having an association relationship is lost, it may be determined that the data packet group is lost. For example, the correlated QoS flow loss rate is 0.02. It is assumed that there is an association relationship between a first QoS flow and a second QoS flow, a data flow transmitted on the first QoS flow includes 1000 data packets, and a data flow transmitted on the second QoS flow includes 1000 data packets. In this case, it needs to be ensured that less than 40 data packets are lost on the first QoS flow and the second QoS flow. Alternatively, a data flow transmitted on the first QoS flow includes 1000 data packet groups, and a data flow transmitted on the second QoS flow includes 1000 data packet groups. In this case, it needs to be ensured that less than 40 data packet groups are lost on the first QoS flow and the second QoS flow.

The correlated QoS flow aggregation loss rate indicates an upper bound for lost importance-based data packet groups or data packets on QoS flows having an association relationship, which may also be understood as an upper bound for lost data packet groups or data packets that can be tolerated. Data packet groups or data packets have different levels of importance. Data packet groups and data packets with different levels of importance may correspond to different weight factors, and weight factors and a quantity of lost data packet groups or data packets are both taken into account for calculation. For example, if a weight factor corresponding to a first data packet group transmitted on QoS flows having an association relationship is 0.5, when the first data packet group is lost, it may be counted as a transmission error of 0.5 data packet groups. For another example, if a weight factor corresponding to a second data packet group is 1, when the second data packet group is lost, it may be counted as a transmission error of 1 data packet group. An example in which a correlated QoS flow aggregation loss rate is 0.02 is used. It is assumed that there is an association relationship between a first QoS flow and a second QoS flow, a data flow transmitted on the first QoS flow includes 1000 data packet groups, and a data flow transmitted on the second QoS flow includes 1000 data packet groups. On the first QoS flow, 10 data packet groups whose weight factors are 1 are lost, and five data packet groups whose weight factors are 0.4 are lost. On the second QoS flow, five data packet groups whose weight factors are 1 are lost, and five data packet groups whose weight factors are 0.4 are lost. In this case, 19 data packet groups may be counted as being lost, and the first QoS flow meets the correlated QoS flow aggregation loss rate. Similarly, for a case in which data packets are transmitted on QoS flows having an association relationship, refer to the foregoing description. Details are not described herein again.

The correlated QoS flow aggregation maximum bit rate indicates an aggregation bit rate of all QoS flows whose types are Non-GBR in a group of QoS flows having an association relationship. The correlated QoS flow aggregation maximum bit rate may be calculated by using an averaging window, that is, an aggregation bit rate within an averaging window. For example, there is an association relationship between a first QoS flow and a second QoS flow, a type of the first QoS flow and a type of the second QoS flow are Non-GBR QoS flows, a bit rate of the first QoS flow is 50 M, and a bit rate of the second QoS flow is 50 M. In this case, a correlated QoS flow aggregation maximum bit rate of the first QoS flow and the second QoS flow is 100 M.

The correlated QoS flow maximum bit rate indicates a maximum bit rate of a group of QoS flows having an association relationship. The correlated QoS flow maximum bit rate may be calculated by using an averaging window, that is, an aggregation bit rate of all QoS flows within an averaging window. For example, there is an association relationship between a first QoS flow and a second QoS flow, a type of the first QoS flow is a GBR QoS flow, a type of the second QoS flow is a Non-GBR QoS flow, a bit rate of the first QoS flow is 50 M, and a bit rate of the second QoS flow is 50 M. In this case, the correlated QoS flow maximum bit rate of the first QoS flow and the second QoS flow is 100 M.

A CQF-5QI is an index value used for associating one or more correlated QoS parameters. Similarly, another correlated QoS parameter may be obtained by using a CQF-5QI.

It should be understood that names of the correlated QoS parameters are merely examples, and are not limited thereto.

It should be further understood that the correlated QoS parameter may be further divided into different QoS parameters based on a data packet and a data packet group (or a media unit) respectively. For example, a correlated QoS flow maximum packet loss rate (Correlated QoS flow Maximum Packet Loss Rate, CQF-MPLR) and a correlated QoS flow maximum media unit loss rate (Correlated QoS flow Maximum Media Unit Loss Rate, CQF-MMULR) respectively indicate upper bounds for data packets and media units that can be lost on a group of QoS flows having an association relationship; a correlated QoS flow packet error rate (Correlated QoS flow Packet Error Rate, CQF-PER) and a correlated QoS flow media unit error rate (Correlated QoS flow Media Unit Error Rate, CQF-MUER) respectively indicate upper bounds for data packets and media units that can be erroneously transmitted on a group of QoS flows having an association relationship; a correlated QoS flow aggregation packet error rate (Correlated QoS flow Aggregation Packet Error Rate, CQF-APER) and a correlated QoS flow aggregation media unit error rate (Correlated QoS flow Aggregation Media Unit Error Rate, CQF-AMUER) respectively indicate upper bounds for weighted data packets and weighted media units that can be erroneously transmitted on a group of QoS flows having an association relationship; and a correlated QoS flow maximum aggregation packet loss rate (Correlated QoS flow Maximum Aggregation Packet Loss Rate, CQF-MAPLR) and a correlated QoS flow maximum aggregation media unit loss rate (Correlated QoS flow Maximum Aggregation Media Unit Loss Rate, CQF-MAM-ULR) respectively indicate upper bounds for weighted data packets and weighted media units that can be lost on a group of QoS flows having an association relationship.

In some other embodiments, the request information may be used to directly request correlated QoS control.

Alternatively, the request information may be used to request non-correlated QoS control, but the first network element may determine, based on a feature of the second service, to use correlated QoS control. For example, the second service is a media service such as an XR service, an I frame of the second service is carried on a second QoS flow, and a P frame of the second service is carried on a third QoS flow. In this case, the first network element may determine to perform correlated QoS control on the second QoS flow and the third QoS flow.

S702: The first network element sends fourth information, where the fourth information includes a QoS parameter used for performing correlated control on the second QoS flow and the third QoS flow.

Specifically, the first network element determines that there is an association relationship between the second QoS flow and the third QoS flow, that is, both the second QoS flow and the third QoS flow are QoS flows for transmitting the second service. The first network element sends the fourth information to the first device, an access network device, and a second network element, where the fourth information includes the QoS parameter used for performing correlated control on the second QoS flow and the third QoS flow.

Optionally, in some embodiments, the fourth information includes a fifth QoS parameter, and the fifth QoS parameter includes K correlated QoS parameters, where K≥1 and K is a positive integer. It may be understood that the first network element may indicate, by using the fifth QoS parameter, to perform correlated QoS control on the second QoS flow and the third QoS flow. For example, when the fifth QoS parameter is a C-5QI, it indicates to perform correlated QoS control on the second QoS flow and the third QoS flow.

For example, the first network element sends a C-5QI to the first device, the access network device, and the second network element, where a value of the C-5QI is 50. In this case, the first device, the access network device, and the second network element may perform, based on the C-5QI, correlated control on a first QoS flow and a second QoS flow that carry the data flow of the first service.

Optionally, in some embodiments, the fourth information includes third indication information and a sixth QoS parameter. The third indication information indicates to perform correlated control on the second QoS flow and the third QoS flow, and the sixth QoS parameter is a parameter used for correlated QoS control. The sixth QoS parameter includes L data packet group-based QoS parameters, L≥1, and L is a positive integer; or the sixth QoS parameter includes J data packet-based QoS parameters, J≥1, and J is a positive integer.

S703: The first device performs correlated QoS control on the data flow of the second service based on the fourth information.

Specifically, after receiving the fourth information, the first device may perform QoS control on the data flow of the second service based on the fourth information. For example, if the second QoS flow carries a data packet or a data packet group whose weight factor is 1, and the third QoS flow carries a data packet or a data packet group whose weight factor is 0.5, the first device may preferentially guarantee transmission of the second QoS flow.

Optionally, in some embodiments, the fourth information includes a fifth QoS parameter, and the fifth QoS parameter includes K correlated QoS parameters, where K≥1 and K is a positive integer.

After receiving the fifth QoS parameter, the first device may determine to perform correlated control on the second QoS flow and the third QoS flow to meet the fifth QoS parameter.

Optionally, in some embodiments, the fourth information includes third indication information and a sixth QoS parameter. The third indication information indicates to perform correlated control on the second QoS flow and the third QoS flow, and the sixth QoS parameter is a parameter used for correlated QoS control. The sixth QoS includes L data packet group-based QoS parameters, L≥1, and L is a positive integer; or the sixth QoS parameter includes J data packet-based QoS parameters, J≥1, and J is a positive integer.

After receiving the third indication information and the sixth QoS parameter, the first device determines, based on the third indication information, to perform correlated control on the second QoS flow and the third QoS flow to meet the sixth QoS parameter. It should be understood that the sixth QoS parameter may be a data packet group-based QoS parameter or a data packet-based QoS parameter, so that a granularity for performing correlated control may be determined. For example, if the sixth QoS parameter is a data packet group-based QoS parameter, correlated control is performed on the second QoS flow and the third QoS flow at a granularity of a data packet group.

S704: The access network device performs correlated QoS control on the data flow of the second service based on the fourth information.

S705: The second network element performs correlated QoS control on the data flow of the second service based on the fourth information.

It may be understood that for descriptions of performing, by the access network device and the second network element, QoS control on the data flow of the second service based on the fourth information, refer to S703. Details are not described herein again.

According to the QoS management method implemented in this disclosure, when a data flow of a service is carried on a plurality of QoS flows, the first device may perform correlated control on the plurality of QoS flows, thereby improving flexibility of QoS management, meeting requirements of different services, and improving user experience.

It should be understood that, in the foregoing steps S701 to S705, (1) the first network element may be an SMF; (2) the second network element may be a UPF; and (3) the first device may be a terminal device or an application server. For ease of understanding of the QoS management method provided in this disclosure, as an example rather than a limitation, the following uses an example in which the first network element is an SMF, the second network element is a UPF, and the first device is a terminal device. S701 to S705 in the method 700 are separately described in detail with reference to a specific example method shown in FIG. 8.

It should be noted that some steps mentioned below are the same as those in the foregoing method 700, and related details are not described herein again. For a specific process, refer to related steps in the method 700. The method 800 is described by using an example of downlink data.

S801: A terminal device sends third information to an SMF, where the third information is used to request QoS for a first service.

In a possible implementation, the terminal device sends the third information to the SMF via an AMF.

It should be understood that, before the terminal device sends the third information to the SMF, the terminal device has established a connection to an application server by using a PDU session, and the first information may be included in session modification request information.

S802: The SMF sends fourth information, where the fourth information indicates to perform correlated control on a second QoS flow and a third QoS flow and indicates a QoS parameter used for performing correlated control on the second QoS flow and the third QoS flow. The second QoS flow and the third QoS flow are used for transmitting a data flow of the first service.

Specifically, the SMF sends the fourth information to the terminal device, an access network device, and a UPF.

In a possible implementation, the SMF sends the fourth information to the access network device via an AMF, and sends the fourth information to the terminal device via the AMF and the access network device. The fourth information may be included in a QoS profile (QoS profile) and sent to the access network device, and the fourth information may be included in a QoS rule (QoS rule) and sent to the terminal device. The fourth information may be included in a packet detection rule (Packet detection rule) and sent to the UPF device.

S803: The application server sends a data flow of the first service to the UPF.

Optionally, in some embodiments, the application server may indicate, in S803, a relationship between a data packet and a data packet group in the data flow of the first service. For example, the data flow of the first service includes 100 data packets, and the 100 data packets may form three data packet groups.

In a possible implementation, the application server adds indication information to a header of a data packet of the first service.

Optionally, in some embodiments, the application server may further indicate, in S803, a weight factor of each data packet group in the data flow of the first service. Weight factors may correspond to different levels of importance, which may be understood as degrees of impact on a user. An XR service is used as an example. A key frame of the XR service has great impact on a user, and an auxiliary frame has small impact on the user. Therefore, a weight factor of the key frame of the XR service is greater than a weight factor of the auxiliary frame.

It should be understood that, for a description of S803, refer to the description of S503. Details are not described herein again.

S804: The UPF sends the data flow of the first service to the access network device.

Specifically, the UPF transmits the data flow of the first service by using the second QoS flow and the third QoS flow, and performs correlated QoS control on the second QoS flow and the third QoS flow based on the fourth information.

Optionally, in some embodiments, the UPF may add mark information to a header of a data packet of the first service, to indicate a quantity of data packet groups of the first service and/or a start data packet and an end data packet of each data packet group and/or a weight factor of each data packet and/or a quantity of data packets included in each data packet group, so that the access network device and the terminal device can perform correlated QoS control on the second QoS flow and the third QoS flow at a granularity of a data packet group.

In a possible implementation, the UPF may obtain the mark information through an indication of the application server, that is, obtain the mark information through step S803.

In a possible implementation, the UPF may obtain the mark information based on service information of the first service.

S805: The access network device sends the data flow of the first service to the terminal device.

Specifically, the access network device receives data of the first service sent by the UPF, and the access network device performs QoS control on the data flow of the first service based on the second information. For example, the access network device may schedule a data packet of the first service based on a correlated QoS flow error rate. The access network device needs to ensure that a ratio of data packets (or data packet groups) that are erroneously transmitted on the second QoS flow and the third QoS flow to all data packets (or all data packet groups) is less than the correlated QoS flow error rate.

S806: The terminal device performs QoS control on the data flow of the first service based on the second information.

It should be understood that, in the method 800, downlink data transmission is used as an example. However, this embodiment of this disclosure is not limited thereto. This embodiment of this disclosure may be further used to transmit uplink data. For example, the terminal device may schedule a data packet of the first service based on a correlated QoS flow error rate. The terminal device needs to ensure that a ratio of data packets (or data packet groups) that are erroneously transmitted on the second QoS flow and the third QoS flow to all data packets (or all data packet groups) is less than the correlated QoS flow error rate.

It should be understood that, when transmitting uplink data, the terminal device may indicate the relationship between the data packet and the data packet group of the first service and/or the weight factor of each data packet group in a manner similar to that of the application server.

According to the QoS management method implemented in this disclosure, when a data flow of a service is carried on a plurality of QoS flows, correlated control may be performed on the plurality of QoS flows, thereby improving flexibility of QoS management, meeting requirements of different services, and improving user experience.

FIG. 9 and FIG. 10 are schematic block diagrams of possible QoS management apparatuses according to embodiments of this disclosure. These apparatuses can implement the functions of the terminal device or any network element in the foregoing method embodiments. Therefore, beneficial effects of the foregoing method embodiments can also be implemented. In embodiments of this disclosure, the apparatus may be a terminal device, or may be a first network element, or may be a second network element or an access network device, or may be applied to a terminal device, a first network element, or a second network element (such as a chip).

FIG. 9 is a schematic block diagram of a QoS management apparatus according to an embodiment of this disclosure. The apparatus 900 includes a transceiver unit 910, and optionally, may further include a processing unit 920.

When the apparatus 900 is configured to implement the function of the first device in the method embodiment in FIG. 4, the transceiver unit 910 is configured to send first information, where the first information is used to request QoS for a first service; and the transceiver unit 910 is further configured to receive second information, where the second information indicates a control manner and a QoS parameter of a first QoS flow, and the first QoS flow is used for transmitting a data flow of the first service. The processing unit 920 is configured to perform QoS control on the data flow of the first service based on the second information.

When the apparatus 900 is configured to implement the function of the first network element in the method embodiment in FIG. 4, the transceiver unit 910 is configured to receive first information from a first device, where the first information is used to request QoS for a first service; and the transceiver unit 910 is further configured to send second information, where the second information indicates a control manner and a QoS parameter of a first QoS flow, and the first QoS flow is used for transmitting a data flow of the first service. The processing unit 920 is configured to determine the control manner and the QoS parameter of the first QoS flow.

When the apparatus 900 is configured to implement the function of the second network element in the method embodiment in FIG. 4, the transceiver unit 910 is configured to receive second information, where the second information indicates a control manner and a QoS parameter of a first QoS flow, and the first QoS flow is used for transmitting a data flow of a first service. The processing unit 920 is configured to perform QoS control on the data flow of the first service based on the second information.

When the apparatus 900 is configured to implement the function of the access network device in the method embodiment in FIG. 4, the transceiver unit 910 is configured to receive second information, where the second information indicates a control manner and a QoS parameter of a first QoS flow, and the first QoS flow is used for transmitting a data flow of a first service. The processing unit 920 is configured to perform QoS control on the data flow of the first service based on the second information.

When the apparatus 900 is configured to implement the function of the first device in the method embodiment in FIG. 7, the transceiver unit 910 is configured to send third information, where the third information is used to request QoS for a second service; and the transceiver unit 910 is further configured to receive fourth information, where the fourth information indicates to perform correlated control on a second QoS flow and a third QoS flow and indicates a QoS parameter used for performing correlated control on the second QoS flow and the third QoS flow, and the second QoS flow and the third QoS flow are used for transmitting a data flow of the second service. The processing unit 920 is configured to perform QoS control on the data flow of the first service based on the fourth information.

When the apparatus 900 is configured to implement the function of the first network element in the method embodiment in FIG. 7, the transceiver unit 910 is configured to receive third information from a first device, where the third information is used to request QoS for a second service; and the transceiver unit 910 is further configured to send fourth information, where the fourth information indicates to perform correlated control on a second QoS flow and a third QoS flow and indicates a QoS parameter used for performing correlated control on the second QoS flow and the third QoS flow, where the second QoS flow and the third QoS flow are used for transmitting a data flow of the second service. The processing unit 920 is configured to determine the QoS parameter used for performing correlated control on the second QoS flow and the third QoS flow.

When the apparatus 900 is configured to implement the function of the second network element in the method embodiment in FIG. 7, the transceiver unit 910 is configured to receive fourth information, where the fourth information indicates to perform correlated control on a second QoS flow and a third QoS flow and indicates a QoS parameter used for performing correlated control on the second QoS flow and the third QoS flow, and the second QoS flow and the third QoS flow are used for transmitting a data flow of the second service. The processing unit 920 is configured to perform QoS control on the data flow of the first service based on the fourth information.

When the apparatus 900 is configured to implement the function of the access network device in the method embodiment in FIG. 7, the transceiver unit 910 is configured to receive second information, where the fourth information indicates to perform correlated control on a second QoS flow and a third QoS flow and indicates a QoS parameter used for performing correlated control on the second QoS flow and the third QoS flow, and the second QoS flow and the third QoS flow are used for transmitting a data flow of the second service. The processing unit 920 is configured to perform QoS control on the data flow of the first service based on the fourth information.

For more detailed descriptions of the transceiver unit 910 and the processing unit 920, refer to related descriptions in the embodiments of the foregoing methods 400 to 800. Details are not described herein again.

FIG. 10 is a schematic block diagram of an apparatus 1000 according to an embodiment of this disclosure. Any network element involved in any one of the foregoing methods 400 to 800 may be implemented by the apparatus shown in FIG. 10.

It should be understood that the apparatus 1000 may be a physical device, a component (for example, an integrated circuit or a chip) of the physical device, or may be a function module in the physical device.

As shown in FIG. 10, the apparatus 1000 includes one or more processors 1001. The processor 1001 may store execution instructions for performing the method in embodiments of this disclosure. Optionally, the processor 1001 may invoke an interface to implement receiving and sending functions. The interface may be a logical interface or a physical interface. This is not limited. For example, the interface may be a transceiver circuit or an interface circuit. The transceiver circuit or the interface circuit configured to implement the receiving and sending functions may be separated or may be integrated together. The transceiver circuit or the interface circuit may be configured to read and write code/data, or the transceiver circuit or the interface circuit may be configured to transmit or transfer a signal.

Optionally, the interface may be implemented through a transceiver. Optionally, the apparatus 1000 may further include a transceiver 1003. The transceiver 1003 may be referred to as a transceiver unit, a transceiver circuit, or the like, and is configured to implement receiving and sending functions.

Optionally, the apparatus 1000 may further include a memory 1002. A specific deployment location of the memory 1002 is not specifically limited in this embodiment of this disclosure. The memory may be integrated into the processor, or may be independent of the processor. When the apparatus 1000 does not include the memory, the apparatus 1000 only needs to have a processing function, and the memory may be deployed at another location (for example, a cloud system).

The processor 1001, the memory 1002, and the transceiver 1003 communicate with each other through an internal connection path, to transfer a control and/or data signal.

It may be understood that, although not shown, the apparatus 1000 may further include another apparatus, for example, an input apparatus, an output apparatus, or a battery.

Optionally, in some embodiments, the memory 1002 may store execution instructions for performing the method in embodiments of this disclosure. The processor 1001 may execute the instructions stored in the memory 1002, to complete, in combination with other hardware (for example, the transceiver 703), steps performed in the foregoing method. For specific working processes and beneficial effects, refer to descriptions in the following method embodiments.

The method disclosed in embodiments of this disclosure may be applied to the processor 1001, or may be implemented by the processor 1001. The processor 1001 may be an integrated circuit chip and has a signal processing capability. In an implementation process, the steps in the foregoing method can be implemented by using a hardware integrated logic circuit in the processor, or by using instructions in a form of software. The processor may be a general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, or a discrete hardware component. It may implement or perform the methods, the steps, and logical block diagrams that are disclosed in embodiments of this disclosure. The general-purpose processor may be a microprocessor, or the processor may be any conventional processor or the like. Steps of the methods disclosed with reference to embodiments of this disclosure may be directly executed and accomplished by using a hardware decoding processor, or may be executed and accomplished by using a combination of hardware and software modules in the decoding processor. The software module may be located in a mature storage medium in the art, for example, a random access memory (random access memory, RAM), a flash memory, a read-only memory (read-only memory, ROM), a programmable read-only memory, an electrically erasable programmable memory, or a register. The storage medium is located in the memory, and the processor reads instructions in the memory and completes the steps in the foregoing method in combination with hardware of the processor.

It may be understood that the memory 1002 may be a volatile memory or a nonvolatile memory, or may include both a volatile memory and a nonvolatile memory. The nonvolatile memory may be a read-only memory ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory RAM, used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

In addition, in this disclosure, the apparatus 900 is presented in a form of function modules. The "module" herein may be an application-specific integrated circuit ASIC, a circuit, a processor that executes one or more software or firmware programs and a memory, an integrated logic circuit, and/or another component capable of providing the foregoing functions. In a simple embodiment, a person skilled in the art may figure out that the apparatus 900 may be in a form shown in FIG. 9. The processing unit 920 may be implemented by using the processor 1001 shown in FIG. 10. Optionally, if the apparatus shown in FIG. 10 includes the memory 1002, the processing unit 920 may be implemented by using the processor 1001 and the memory 1002. The transceiver unit 910 may be implemented by using the transceiver 1003 shown in FIG. 10. The transceiver 1003 includes a receiving function and a sending function. Specifically, the processor is implemented by executing a computer program stored in the memory. Optionally, when the apparatus 900 is a chip, a function and/or an implementation process of the transceiver unit 910 may be alternatively implemented by using a pin, a circuit, or the like. Optionally, the memory may be a storage unit on the chip, such as a register or a cache. The storage unit may be a storage unit that is in the apparatus and that is located outside the chip, for example, the memory 1002 shown in FIG. 10, or may be a storage unit that is deployed in another system or device but not located in the apparatus. A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

Various aspects or features of this disclosure may be implemented as methods, apparatuses, or products using standard programming and/or engineering techniques. The term "product" used in this disclosure covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory (for example, an erasable programmable read-only memory (erasable programmable read-only memory, EPROM), a card, a rod, or a key drive). In addition, various storage media described in this specification may indicate one or more devices and/or other machine-readable media that are configured to store information. The term "machine-readable media" may include but is not limited to a radio channel, and various other media that can store, contain and/or carry instructions and/or data.

This disclosure further provides a computer-readable medium, storing a computer program thereon. When the computer program is executed by a computer, a function of any one of the foregoing method embodiments is implemented.

This disclosure further provides a computer program product. When the computer program product is executed by a computer, functions of any one of the foregoing method embodiments are implemented. All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (solid state disk, SSD)), or the like.

It should be understood that, an "embodiment" mentioned throughout this specification means that particular features, structures, or characteristics related to the embodiment are included in at least one embodiment of this disclosure. Therefore, embodiments in the entire specification do not necessarily refer to a same embodiment. In addition, these particular features, structures, or characteristics may be combined in one or more embodiments in any appropriate manner. It should be understood that sequence numbers of the processes do not mean an execution sequence in various embodiments of this disclosure. The execution sequence of the processes should be determined based on functions and internal logic of the processes, and should not be construed as any limitation on implementation processes of embodiments of this disclosure.

It should be further understood that, in this disclosure, "when" and "if" mean that UE or a base station performs corresponding processing in an objective situation, but do not constitute any limitation on time, do not require the UE or the base station to perform a determining action during implementation, and do not mean other limitations either.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, or C" may represent the following seven cases: A exists alone, B exists alone, C exists alone, A and B coexist, B and C coexist, A and C coexist, and A, B, and C coexist.

In this disclosure, unless otherwise specified, "at least one" means one or more, and "a plurality of" means two or more.

It should be understood that in embodiments of this disclosure, "B corresponding to A" indicates that B is associated with A, and B may be determined based on A. However, it should be understood that determining B based on A does not mean that B is determined based on only A. B may alternatively be determined based on A and/or other information.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A QoS (quality of service) management method, comprising:

receiving first information, wherein the first information is for requesting QoS for a first service; and sending second information, wherein the second information comprises a first QoS parameter of a first QoS flow, wherein the first QoS parameter comprising N data packet group-based QoS parameters, and the first QoS parameter indicates a QoS control manner of the first QoS flow, wherein the first QoS flow is for transmitting a data flow of the first service, wherein the QoS control manner comprises a first control manner for controlling on a data packet group basis, and wherein N is a positive integer greater than or equal to 1.

2. The method of claim 1, wherein the first QoS parameter comprises a group delay budget or a group error rate.

3. The method of claim 2, wherein:

the group delay budget indicates an upper bound for a time that a data packet group on the first QoS flow is delayed between a terminal device and a user plane function network element; and the group error rate indicates an upper bound for a rate of data packet groups that are not successfully delivered on the first QoS flow.

4. The method according to claim 1, wherein the method further comprises:

receiving the second information; and performing QoS control on the data flow of the first service based on the second information.

5. The method according to claim 4, wherein the performing QoS control on the data flow of the first service based on the second information comprises:

performing, based on the first QoS parameter, the QoS control on the data flow of the first service on a data packet group basis.

6. The method according to claim 4, wherein the method further comprises:

determining, based on the first QoS parameter, that the QoS control manner of the first QoS flow is the first control manner.

7. An apparatus comprising:

at least one processor; and at least one memory storing instructions that, when executed by the at least one processor, cause the at least one processor to cause the apparatus to:

receive first information, wherein the first information is for requesting QoS (quality of service) for a first service; and send second information, wherein the second information comprises a first QoS parameter of a first QoS flow, wherein the first QoS parameter comprising N data packet group-based QoS parameters, and the first QoS parameter indicates a QoS control manner of the first QoS flow, wherein the first QoS flow is for transmitting a data flow of the first service, wherein the QoS control manner comprises a first control manner for controlling on a data packet group basis, and wherein N is a positive integer greater than or equal to 1.

8. The apparatus of claim 7, wherein the first QoS parameter comprises a group delay budget or a group error rate.

9. The apparatus of claim 8, wherein the group delay budget indicates an upper bound for a time that a data packet group on the first QoS flow is delayed between a terminal device and a user plane function network element; and the group error rate indicates an upper bound for a rate of data packet groups that are not successfully delivered on the first QoS flow.

10. A non-transitory computer-readable storage medium, wherein the non-transitory computer-readable storage medium stores a computer program or instructions and, when the computer program or the instructions are run on a computer, the computer is enabled to:

receive first information, wherein the first information is for requesting QoS for a first service; and send second information, wherein the second information comprises a first QoS parameter of a first QoS flow, wherein the first QoS parameter comprising N data packet group-based QoS parameters, and the first QoS parameter indicates a QoS control manner of the first QoS flow, wherein the first QoS flow is for transmitting a data flow of the first service, wherein the QoS control manner comprises a first control manner for controlling on a data packet group basis, and wherein N is a positive integer greater than or equal to 1.

11. The non-transitory computer-readable storage medium of claim 10, wherein the first QoS parameter comprises a group delay budget or a group error rate.

12. The non-transitory computer-readable storage medium of claim 11, wherein the group delay budget indicates an upper bound for a time that a data packet group on the first QoS flow is delayed between a terminal device and a user plane function network element; and the group error rate indicates an upper bound for a rate of data packet groups that are not successfully delivered on the first QoS flow.

13. A system, comprising:

a first apparatus configured to:

receive first information, wherein the first information is for requesting QoS for a first service; and send second information, wherein the second information comprises a first QoS parameter of a first QoS flow, wherein the first QoS parameter comprising N data packet group-based QoS parameters, and the first QoS parameter indicates a QoS control manner of the first QoS flow, wherein the first QoS flow is for transmitting a data flow of the first service, wherein the QoS control manner comprises a first control manner for controlling on a data packet group basis, and wherein N is a positive integer greater than or equal to 1; and a second apparatus, configured to:

receive the second information; and perform QoS control on the data flow of the first service based on the second information.

14. The system according to claim 13, wherein the first QoS parameter comprises a group delay budget or a group error rate.

15. The system according to claim 14, wherein:

the group delay budget indicates an upper bound for a time that a data packet group on the first QoS flow is delayed between a terminal device and a user plane function network element; and the group error rate indicates an upper bound for a rate of data packet groups that are not successfully delivered on the first QoS flow.

16. The system according to claim 13, wherein the second apparatus is further configured to:

perform, based on the first QoS parameter, the QoS control on the data flow of the first service on a data packet group basis.

17. The system according to claim 13, wherein the second apparatus is further configured to:

determine, based on the first QoS parameter, that the QoS control manner of the first QoS flow is the first control manner.

\* \* \* \* \*